(12) United States Patent
Urano et al.

(10) Patent No.: US 10,852,726 B2
(45) Date of Patent: Dec. 1, 2020

(54) SYSTEMS AND METHODS FOR TRANSITIONING A VEHICLE FROM AN AUTONOMOUS DRIVING MODE TO A MANUAL DRIVING MODE

(71) Applicant: Toyota Research Institute, Inc., Los Altos, CA (US)

(72) Inventors: Hiromitsu Urano, Ann Arbor, MI (US); Kentaro Ichikawa, Ann Arbor, MI (US); Taisuke Sugaiwa, Ann Arbor, MI (US)

(73) Assignee: Toyota Research Institute, Inc., Los Altos, CA (US)

( * ) Notice: Subject to any disclaimer, the term of this patent is extended or adjusted under 35 U.S.C. 154(b) by 135 days.

(21) Appl. No.: 16/189,220

(22) Filed: Nov. 13, 2018

(65) Prior Publication Data
US 2020/0150652 A1    May 14, 2020

(51) Int. Cl.
*B60W 60/00* (2020.01)
*G05D 1/00* (2006.01)
(Continued)

(52) U.S. Cl.
CPC ......... *G05D 1/0061* (2013.01); *B60W 50/082* (2013.01); *B60W 50/14* (2013.01);
(Continued)

(58) Field of Classification Search
CPC . G05D 1/0061; G05D 1/0066; B60W 50/082; B60W 2050/0095; B60W 60/00186; B60W 60/005
See application file for complete search history.

(56) References Cited

U.S. PATENT DOCUMENTS 9,594,373 B2   3/2017 Solyom et al.
9,919,716 B2   3/2018 Christensen et al.
(Continued)

OTHER PUBLICATIONS

Wang et al., "Predictive Lane Detection by Interaction with Digital Road Map," Journal of Information Processing, vol. 20, No. 1, pp. 287-296, Jan. 2012, found at https://www.jstage.jst.go.jp/article/ipsjjip/20/1/20_1_287/_pdf.
(Continued)

*Primary Examiner* — Kenneth J Malkowski
(74) *Attorney, Agent, or Firm* — Christopher G. Darrow; Darrow Mustafa PC

(57) ABSTRACT

System, methods, and other embodiments described herein relate to transitioning a vehicle from an autonomous to a manual driving mode. One embodiment analyzes data from one or more vehicle sensors to detect, at a current vehicle position, features in a first detection region and a second detection region ahead of the vehicle; determines, for each of one or more hypothetical vehicle positions, which features detected at the current position, if any, lie within the first detection region at that hypothetical position; identifies, among the one or more hypothetical positions, at least one localization-failure position at which localization of the vehicle will fail due to insufficient features being detected within the first detection region at the at least one localization-failure position; and initiates a transition from the autonomous driving mode to the manual driving mode based, at least in part, on the at least one localization-failure position.

20 Claims, 14 Drawing Sheets

(51) Int. Cl.
*B60W 50/08* (2020.01)
*B60W 50/14* (2020.01)
*G05D 1/02* (2020.01)

(52) U.S. Cl.
CPC ..... *B60W 2420/42* (2013.01); *B60W 2420/52* (2013.01); *B60W 2554/00* (2020.02); *B60W 2555/60* (2020.02); *B60W 2900/00* (2013.01); *G05D 1/0236* (2013.01); *G05D 1/0246* (2013.01); *G05D 2201/0213* (2013.01)

(56) References Cited

U.S. PATENT DOCUMENTS

| 2015/0094899 | A1 | 4/2015 | Hackenberg et al. | |
| 2015/0252088 | A1* | 9/2015 | Scher | C07K 14/51 |
| | | | | 435/252.33 |
| 2016/0121907 | A1* | 5/2016 | Otake | B60W 10/18 |
| | | | | 701/23 |
| 2017/0300052 | A1 | 10/2017 | Harda et al. | |
| 2018/0059661 | A1* | 3/2018 | Sato | G05D 1/0088 |
| 2018/0186391 | A1 | 7/2018 | Gariepy et al. | |

OTHER PUBLICATIONS

Boroun, "Lane Detection and Tracking Using a Linear Parabolic Model," Master's Thesis, Feb. 2015, found at https://pdfs.semanticscholar.org/e515/7715f52d37d84cb2c5071cf9646f1fee24fb.pdf.

Hota et al., "A Simple and Efficient Lane Detection using Clustering and Weighted Regression," 15th International Conference on Management of Data COMAD 2009, Mysore, India, Dec. 9-12, 2009, found at https://pdfs.semanticscholar.org/a3cc/4bd6813fc096f93508b085d45cdeccf7bff7.pdf.

Hecker et al., "Failure Prediction for Autonomous Driving," May 4, 2018, found at https://arxiv.org/pdf/1805.01811.pdf.

Vivacqua et al., "A Low Cost Sensors Approach for Accurate Vehicle Localization and Autonomous Driving Application," Oct. 16, 2017, found at https://www.ncbi.nlm.nih.gov/pmc/articles/PMC5676663/pdf/sensors-17-02359.pdf.

* cited by examiner

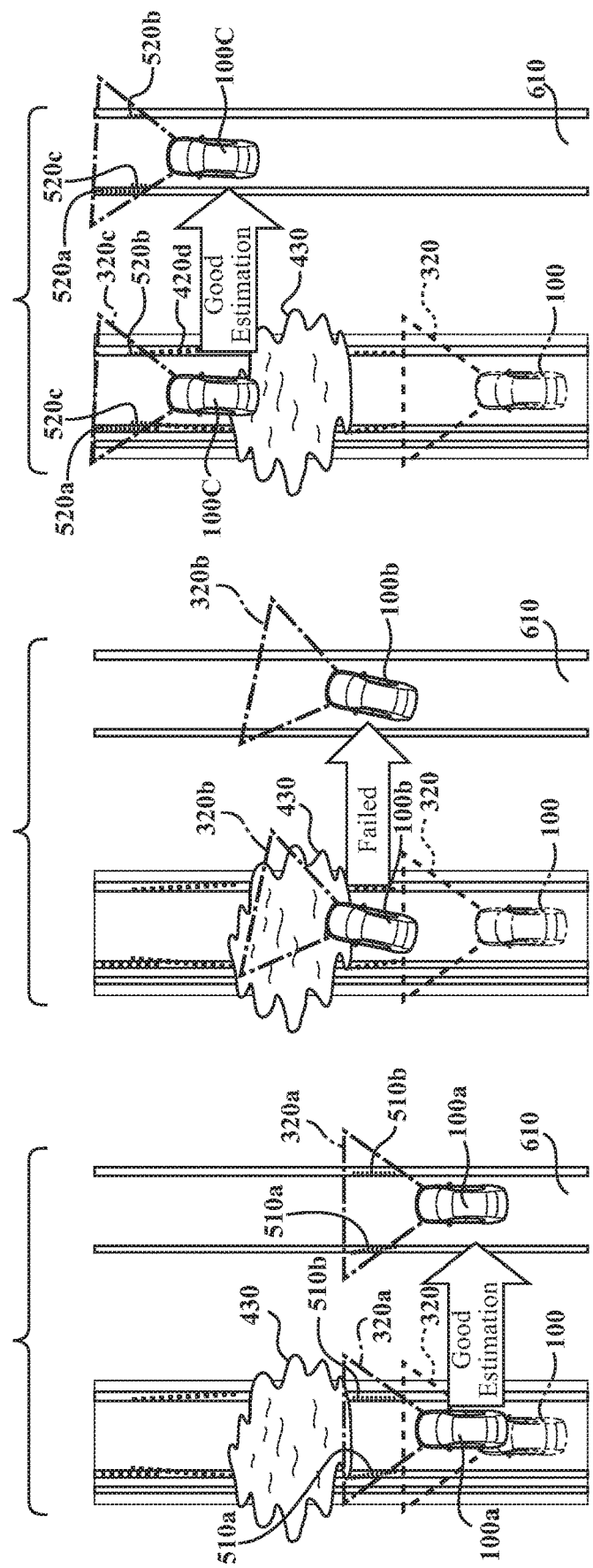

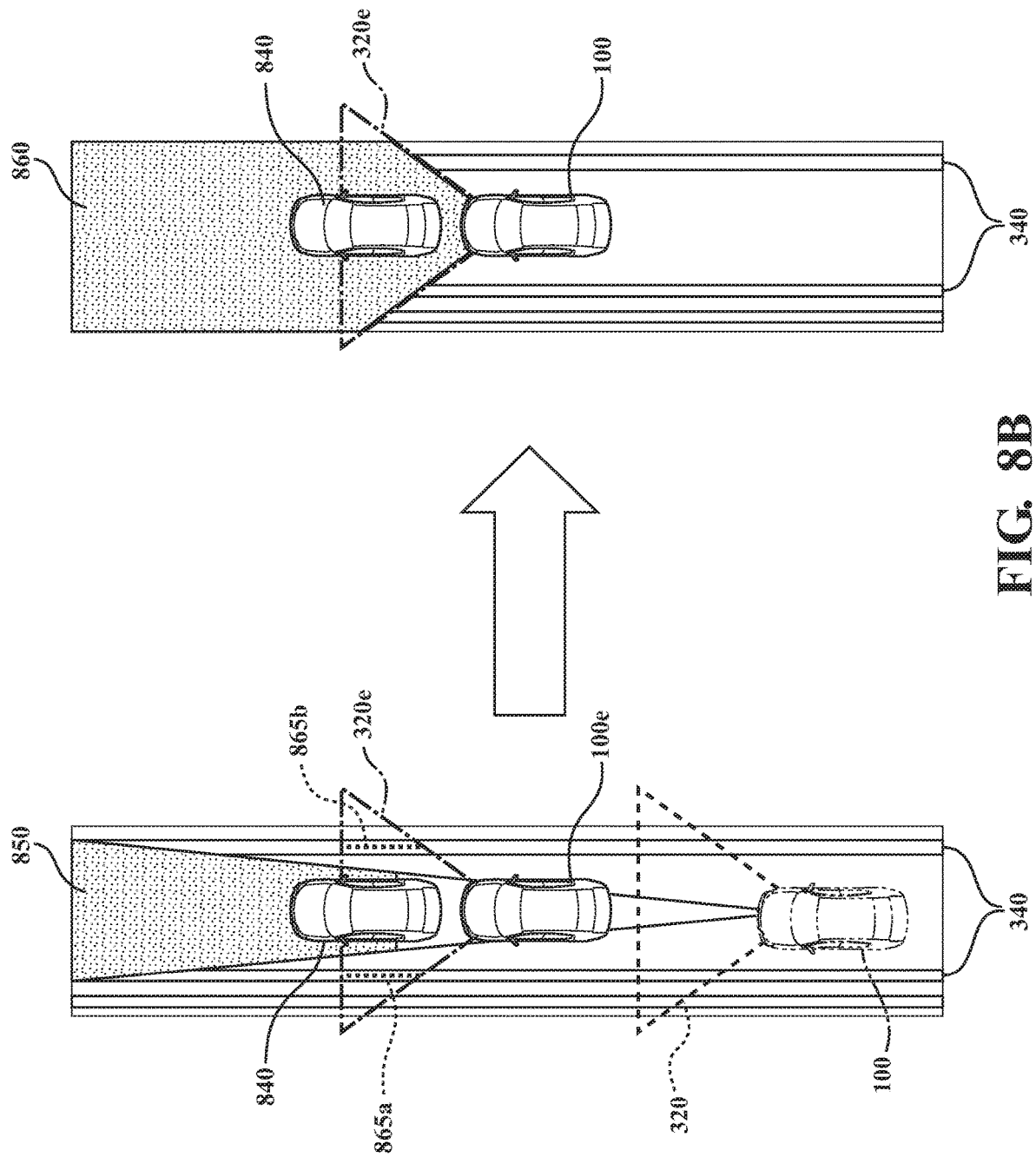

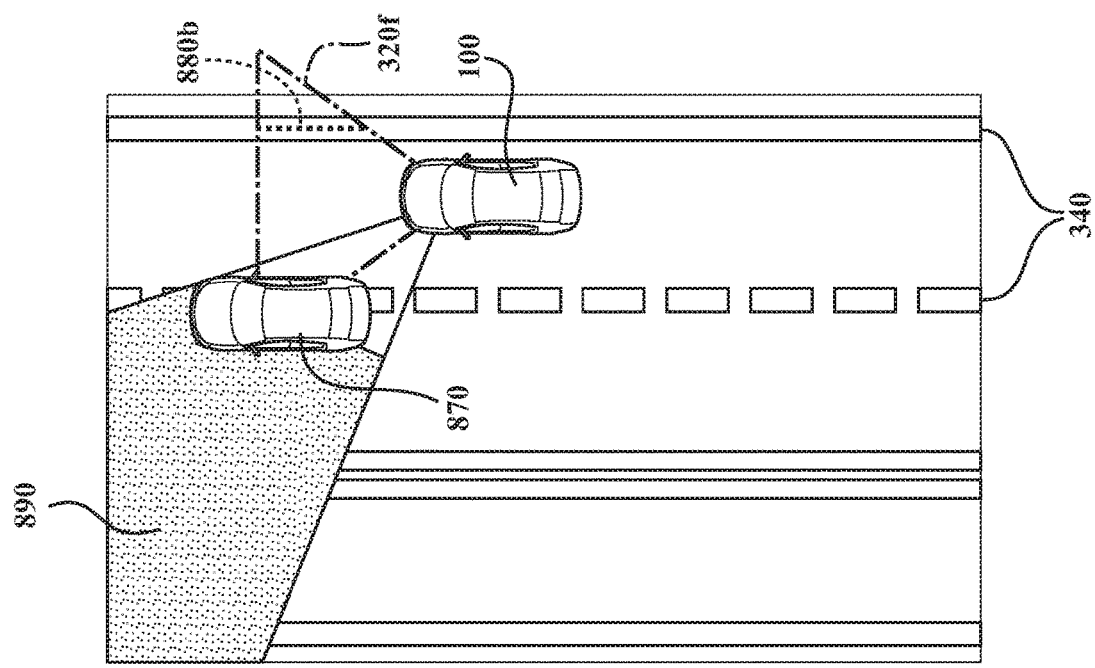
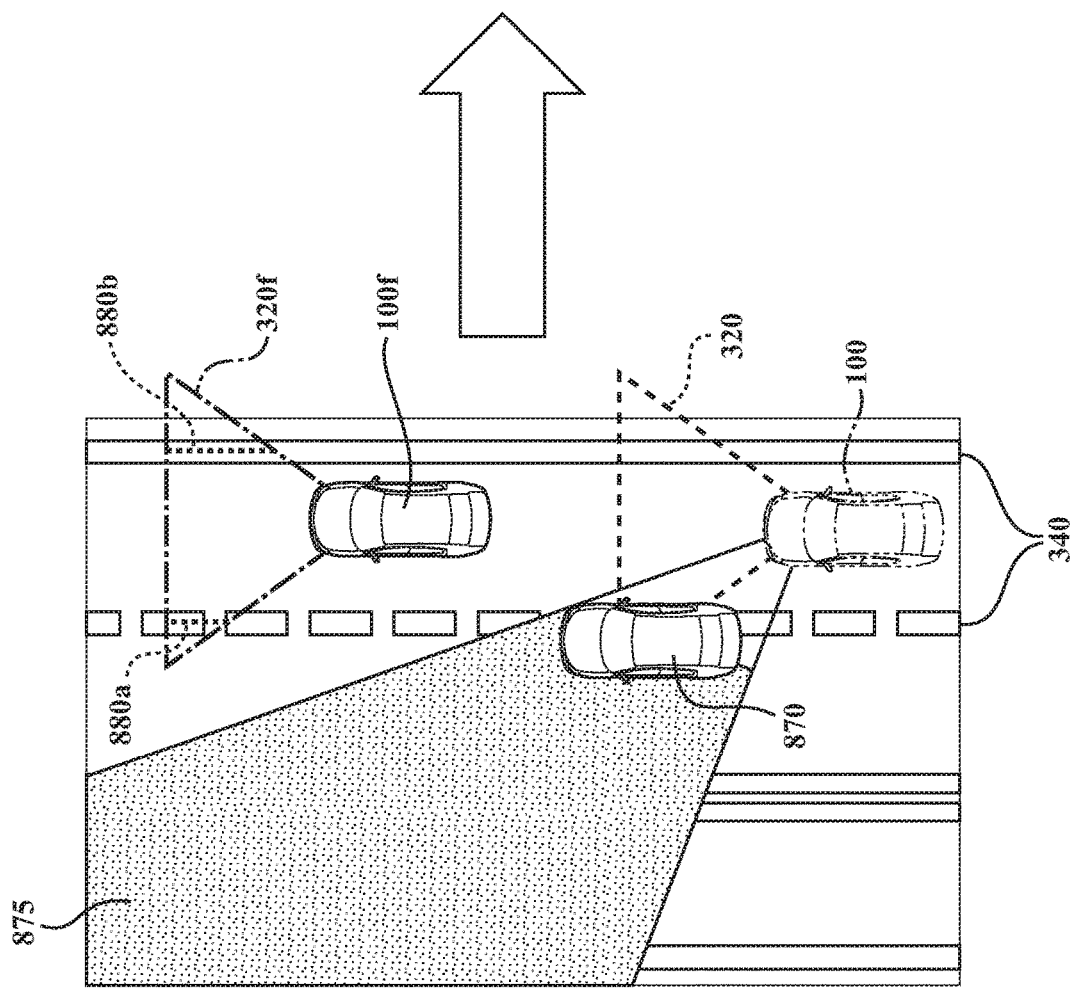
FIG. 8C

SYSTEMS AND METHODS FOR TRANSITIONING A VEHICLE FROM AN AUTONOMOUS DRIVING MODE TO A MANUAL DRIVING MODE

TECHNICAL FIELD

The subject matter described herein relates in general to autonomous vehicles and, more particularly, to systems and methods for transitioning a vehicle from an autonomous driving mode to a manual driving mode.

BACKGROUND

Autonomous vehicles can sense a surrounding environment (e.g., obstacles, roadway, etc.) and navigate autonomously through the surrounding environment without human input or at least partially without human input. That is, autonomous vehicles can operate according to different levels of autonomy. For example, an autonomous vehicle can operate according to the Society of Automotive Engineers (SAE) Level 2 classification for autonomous driving. In this autonomous operating mode, an autonomous vehicle relies, at least in part, on handovers from autonomous operation to manual control by a vehicle operator when the vehicle cannot or should not autonomously operate due to various circumstances. A handover can be initiated by the vehicle or through the intervention of an operator.

SUMMARY

Systems and methods for transitioning a vehicle from an autonomous driving mode to a manual driving mode are disclosed. One embodiment is a system for transitioning a vehicle from an autonomous driving mode to a manual driving mode that includes one or more sensors, one or more processors, and a memory communicably coupled to the one or more processors. The memory stores a feature detection module including instructions that when executed by the one or more processors cause the one or more processors to analyze data from the one or more sensors to detect, at a current position of the vehicle, features ahead of the vehicle in a first detection region and a second detection region, wherein the second detection region extends farther ahead of the vehicle along a direction of travel than the first detection region. The memory also stores a feature detection simulation module including instructions that when executed by the one or more processors cause the one or more processors to determine, for each of one or more hypothetical positions ahead of the current position along a planned route, which features detected at the current position, if any, lie within the first detection region at that hypothetical position. The memory also stores a localization simulation module including instructions that when executed by the one or more processors cause the one or more processors to identify, among the one or more hypothetical positions, at least one localization-failure position at which localization of the vehicle will fail due to insufficient features being detected within the first detection region at the at least one localization-failure position. The memory also stores a driving-mode control module including instructions that when executed by the one or more processors cause the one or more processors to receive, from the localization simulation module, the at least one localization-failure position and initiate a transition from the autonomous driving mode to the manual driving mode based, at least in part, on the at least one localization-failure position.

Another embodiment is a non-transitory computer-readable medium for transitioning a vehicle from an autonomous driving mode to a manual driving mode and storing instructions that when executed by one or more processors cause the one or more processors to analyze data from one or more vehicle sensors to detect, at a current position of the vehicle, features ahead of the vehicle in a first detection region and a second detection region, wherein the second detection region extends farther ahead of the vehicle along a direction of travel than the first detection region. The instructions also include instructions to determine, for each of one or more hypothetical positions ahead of the current position along a planned route, which features detected at the current position, if any, lie within the first detection region at that hypothetical position. The instructions also include instructions to identify, among the one or more hypothetical positions, at least one localization-failure position at which localization of the vehicle will fail due to insufficient features being detected within the first detection region at the at least one localization-failure position. The instructions also include instructions to initiate a transition from the autonomous driving mode to the manual driving mode based, at least in part, on the at least one localization-failure position.

Another embodiment is a method of transitioning a vehicle from an autonomous driving mode to a manual driving mode, comprising analyzing data from one or more vehicle sensors to detect, at a current position of the vehicle, features ahead of the vehicle in a first detection region and a second detection region, wherein the second detection region extends farther ahead of the vehicle along a direction of travel than the first detection region; determining, for each of one or more hypothetical positions ahead of the current position along a planned route, which features detected at the current position, if any, lie within the first detection region at that hypothetical position; identifying, among the one or more hypothetical positions, at least one localization-failure position at which localization of the vehicle will fail due to insufficient features being detected within the first detection region at the at least one localization-failure position; and initiating a transition from the autonomous driving mode to the manual driving mode based, at least in part, on the at least one localization-failure position.

BRIEF DESCRIPTION OF THE DRAWINGS

The accompanying drawings, which are incorporated in and constitute a part of the specification, illustrate various systems, methods, and other embodiments of the disclosure. It will be appreciated that the illustrated element boundaries (e.g., boxes, groups of boxes, or other shapes) in the figures represent one embodiment of the boundaries. In some embodiments, one element may be designed as multiple elements or multiple elements may be designed as one element. In some embodiments, an element shown as an internal component of another element may be implemented as an external component and vice versa. Furthermore, elements may not be drawn to scale.

FIGS. 6A-6C illustrate localization simulation at three different hypothetical vehicle positions, in accordance with an illustrative embodiment of the invention.

FIGS. 8A-8C illustrate some ways in which obstacles can affect feature detection and, ultimately, localization, in accordance with an illustrative embodiment of the invention.

DETAILED DESCRIPTION

Systems, methods, and other embodiments associated with transitioning a vehicle from an autonomous mode of operation ("autonomous driving mode") to a manual mode of operation ("manual driving mode") are disclosed. Research has shown that an alert driver watching the road ahead requires about 1.4 seconds to respond to a notification to take manual control of the vehicle. If the driver is engaged in another activity (e.g., reading a book), that time grows to about four seconds. Therefore, when a handover to a human driver becomes necessary, it is desirable for the vehicle to give the driver as much notice as possible.

One of the conditions that can necessitate a handover is failure of a vehicle's localization system. Localization is the process of comparing detected features such as lane markings with map data to determine accurately the vehicle's current position. The embodiments described herein can accomplish the goal of providing earlier notice of an impending handover by detecting localization failures earlier.

In some embodiments, the vehicle includes one or more of cameras and Light Detection and Ranging (LIDAR) sensors for detecting features such as lane markings ahead of the vehicle's direction of travel along a planned route. This forward feature-detection region is divided into at least two subregions, which may or may not overlap, depending on the embodiment. In some embodiments, the forward feature-detection region is divided into a first detection region and a second detection region. Though it is an arbitrary choice, throughout this Detailed Description, the "first detection region" is the area immediately ahead of the vehicle and extending a predetermined distance ahead along the roadway, and the "second detection region" encompasses a portion of the roadway environment that is farther ahead than that encompassed by the first detection region. Herein, the first detection region will sometimes be referred to as the "near detection region," and the second detection region will sometimes be referred to as the "far detection region"

As explained in greater detail below, detecting features in the second detection region (the far detection region), combined with the techniques of feature detection simulation, localization simulation, and, in some embodiments, obstacles simulation, permits an upcoming localization failure to be detected earlier. Detecting a localization failure earlier makes it possible, in turn, for the system to provide earlier notice to a driver of an imminent handover.

Figure 1:
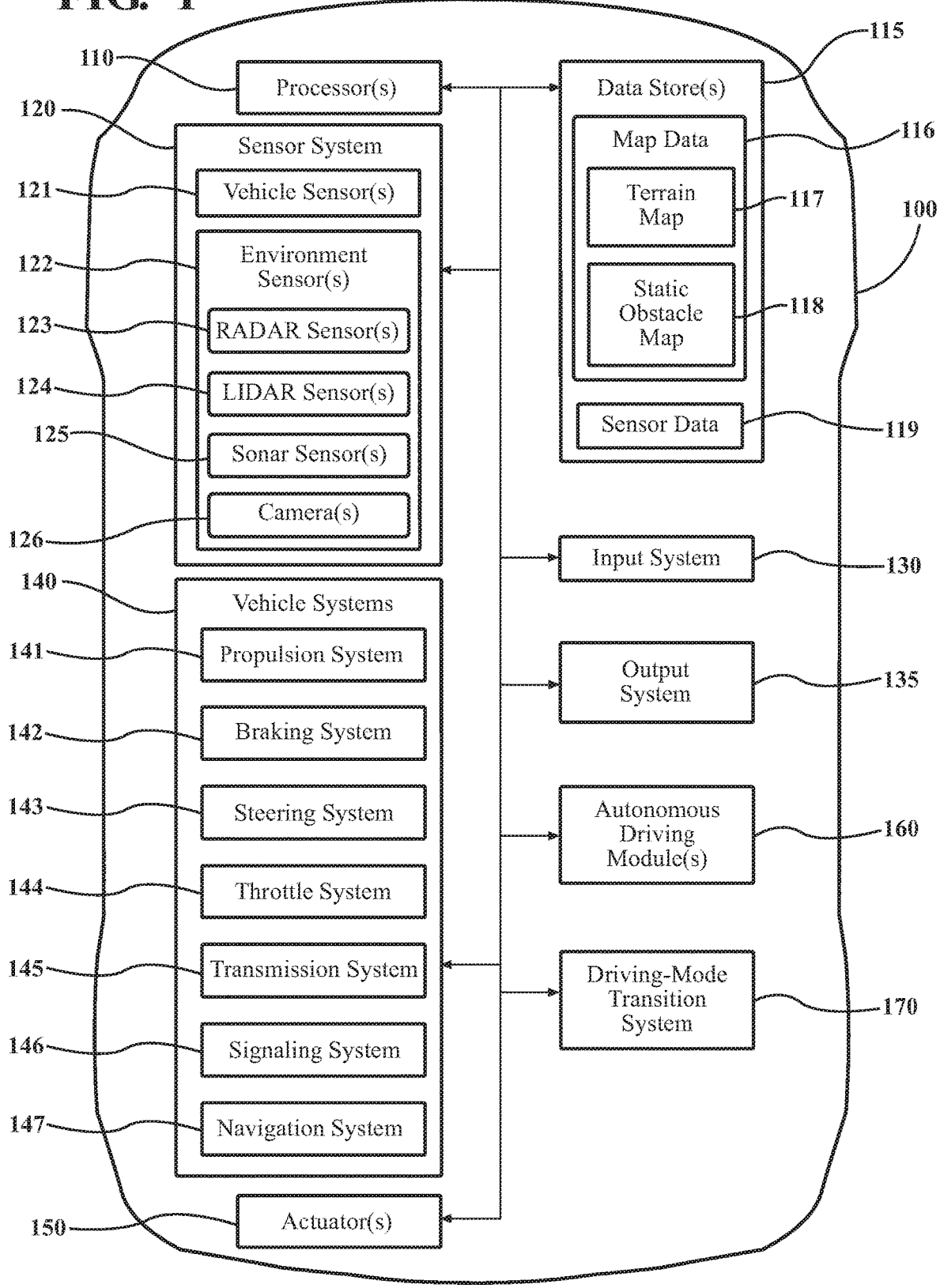
FIG. 1 illustrates one embodiment of an autonomous vehicle within which systems and methods disclosed herein may be implemented.

Referring to FIG. 1, an example of a vehicle 100 is illustrated. As used herein, a "vehicle" is any form of motorized transport. In one or more implementations, the vehicle 100 is an automobile. While arrangements will be described herein with respect to automobiles, it will be understood that embodiments are not limited to automobiles. In some implementations, the vehicle 100 may be any other form of motorized transport.

The vehicle 100 also includes various elements. It will be understood that in various embodiments it may not be necessary for the vehicle 100 to have all of the elements shown in FIG. 1. The vehicle 100 can have any combination of the various elements shown in FIG. 1. Further, the vehicle 100 can have additional elements to those shown in FIG. 1. In some arrangements, the vehicle 100 may be implemented without one or more of the elements shown in FIG. 1. While the various elements are shown as being located within the vehicle 100 in FIG. 1, it will be understood that one or more of these elements can be located external to the vehicle 100, either wholly or in part. Further, the elements shown may be physically separated by large distances.

Some of the possible elements of the vehicle 100 are shown in FIG. 1 and will be described along with subsequent figures. However, a description of many of the elements in FIG. 1 will be provided after the discussion of FIGS. 2-12 for purposes of brevity of this description. Additionally, it will be appreciated that for simplicity and clarity of illustration, where appropriate, reference numerals have been repeated among the different figures to indicate corresponding or analogous elements. In addition, the discussion outlines numerous specific details to provide a thorough understanding of the embodiments described herein. Those of skill in the art, however, will understand that the embodiments described herein may be practiced using various combinations of these elements.

Vehicle 100 includes a driving-mode transition system 170, which is implemented to perform methods and other functions as disclosed herein relating to the vehicle 100 transitioning from an autonomous driving mode controlled by autonomous driving module(s) 160 to a manual driving mode in which all of or a majority of the navigation and/or maneuvering of the vehicle is performed according to inputs received from a user (e.g., a human driver/operator). Various autonomous and manual driving modes are defined and discussed in greater detail below following the discussion of FIGS. 2-12.

Figure 2:
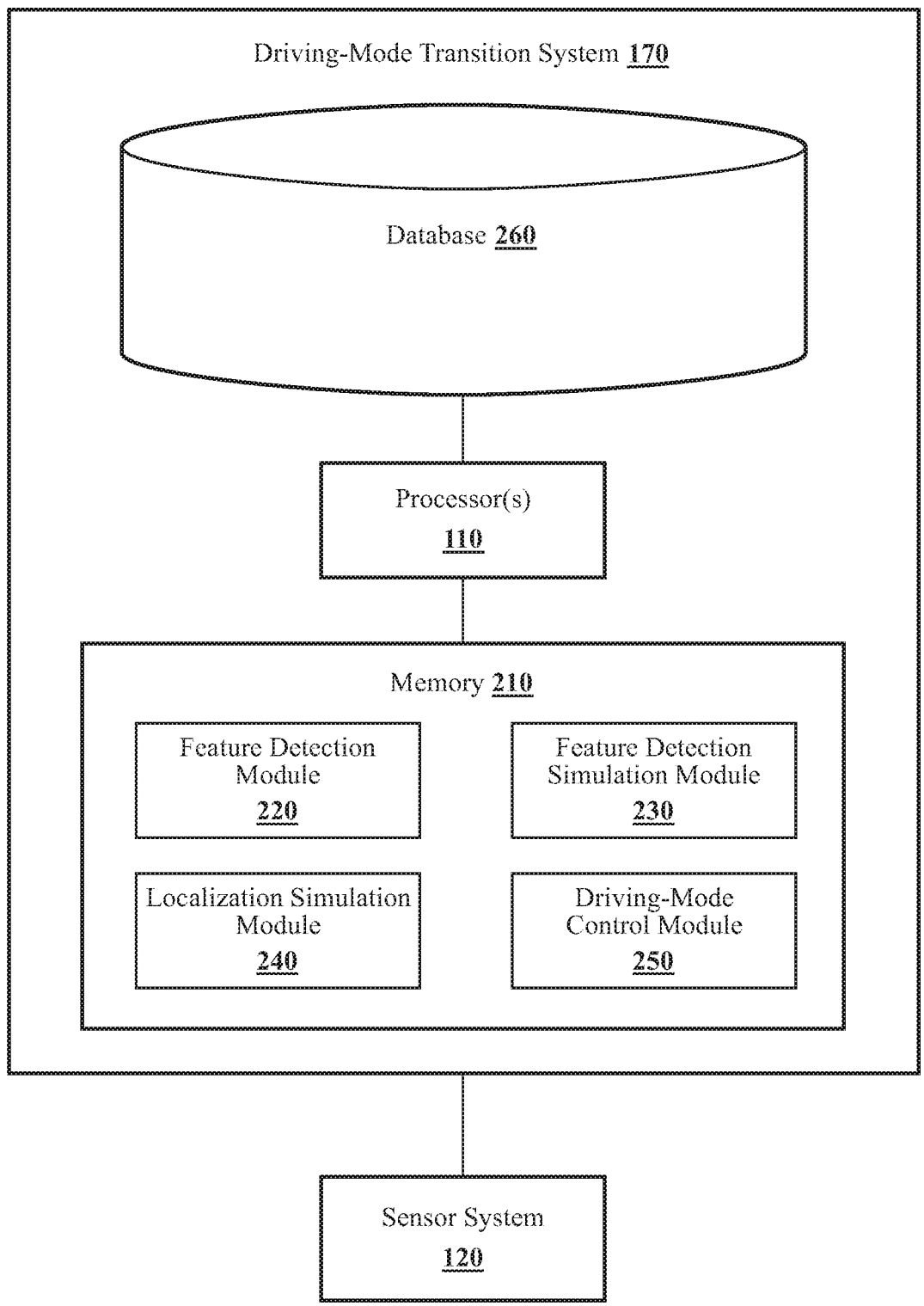
FIG. 2 illustrates one embodiment of a driving-mode transition system.

With reference to FIG. 2, one embodiment of the driving-mode transition system 170 of FIG. 1 is further illustrated. The driving-mode transition system 170 is shown as including one or more processors 110 from the vehicle 100 of FIG. 1. Accordingly, the one or more processors 110 may be a part of the driving-mode transition system 170, the driving-mode transition system 170 may include a separate processor from the one or more processors 110 of the vehicle 100, or the driving-mode transition system 170 may access the one or more processors 110 through a data bus or another communication path. In one embodiment, the driving-mode transition system 170 includes a memory 210 that stores a feature detection module 220, a feature detection simulation module 230, a localization simulation module 240, and a driving-mode control module 250. The memory 210 is a random-access memory (RAM), read-only memory (ROM), a hard-disk drive, a flash memory, or other suitable memory for storing the modules 220, 230, 240, and 250. The modules 220, 230, 240, and 250 are, for example, computer-readable instructions that when executed by the one or more processors 110, cause the one or more processors 110 to perform the various functions disclosed herein. Database 260, which stores data concerning feature detection, localization, and handovers, can reside in vehicle 100, can reside on a network server ("in the cloud"), or can be distributed between vehicle 100 and one or more network servers, depending on the embodiment.

The feature detection module 220 generally includes instructions that function to control the one or more processors 110 to analyze data from sensor system 120 to detect features that lie ahead of the current position of vehicle 100 along the vehicle's planned route. In some embodiments, the sensor data includes image data from one or more cameras 126, point-cloud data from one or more LIDAR sensors 124, or a combination of the two. In other embodiments, other types of sensors such as radar or sonar are used. Feature detection module 220 is capable of detecting various types of features on or near a roadway ahead of vehicle 100 such as, without limitation, lines (center lines, lane lines, etc.), curbs, poles, walls, or traffic signs. Feature detection supports the localization process of vehicle 100, which is discussed in greater detail below. Note that vehicle 100 may include other subsystems or modules besides feature detection module 220 that detect features in other directions (behind vehicle 100, to the side of vehicle 100, etc.). The operation of feature detection module 220 is further explained in connection with FIG. 3.

Figure 3:
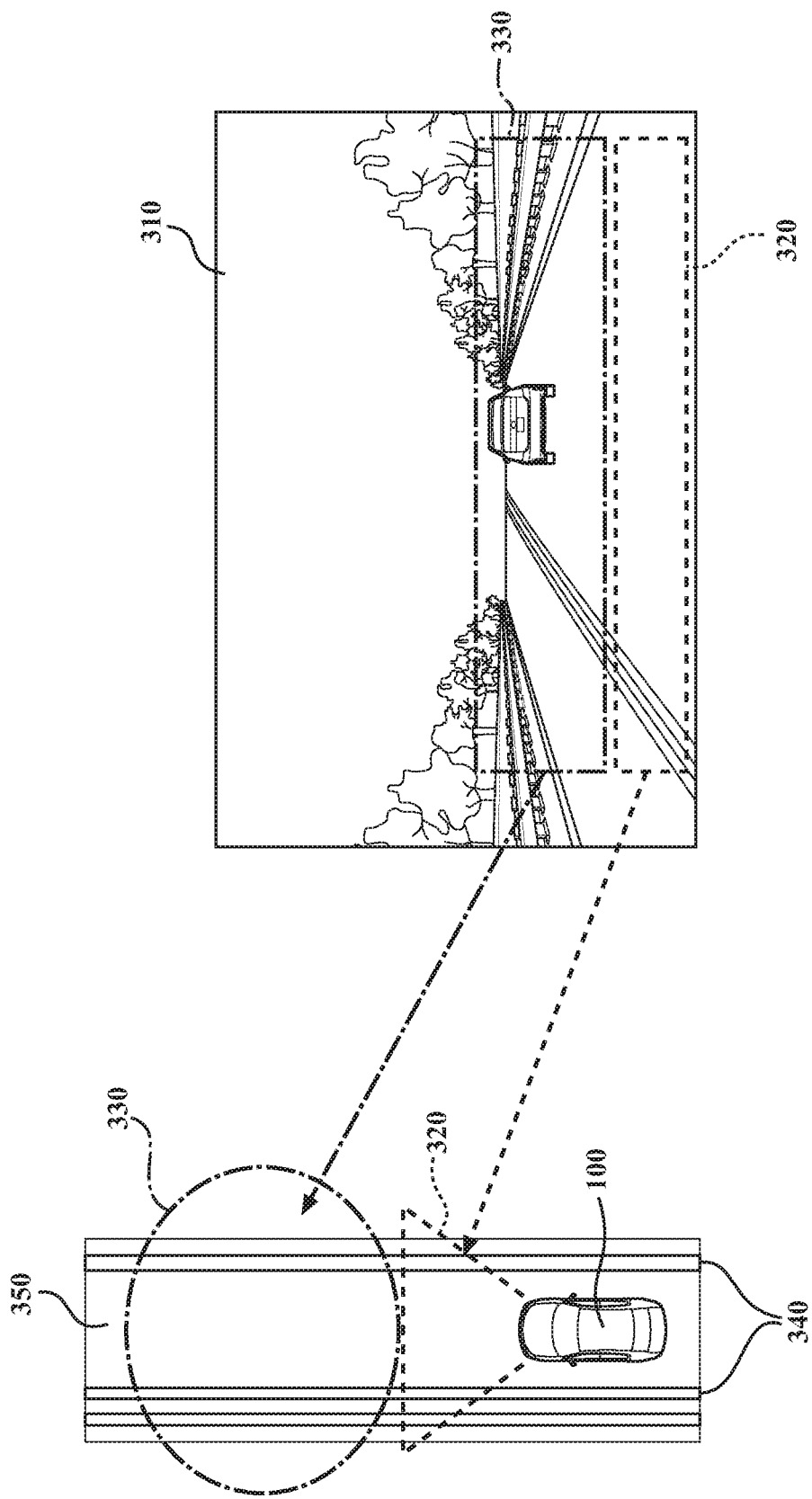
FIG. 3 illustrates a scene from a forward-facing camera of a vehicle that has been divided into first and second detection regions, in accordance with an illustrative embodiment of the invention.

FIG. 3 illustrates a scene 310 from a forward-facing camera 126 of vehicle 100 that has been divided into first and second detection regions, in accordance with an illustrative embodiment of the invention. Within scene 310, feature detection module 220 delineates first detection region 320 and second detection region 330. In this particular embodiment, the first and second detection regions are shown as non-overlapping rectangular-shaped regions (see right side of FIG. 3). In other embodiments, the two regions can overlap. In still other embodiments, the respective first and second detection regions can have a shape different from a rectangle. In some embodiments, there can be more than two detection regions. In some embodiments employing cameras, the first detection region 320 extends from the front of vehicle 100 to approximately 30 meters ahead of vehicle 100, and the second detection region 330 extends from about 30 meters ahead of vehicle 100 to about 100 meters ahead of vehicle 100. In some embodiments employing LIDAR sensors 124, the first detection region 320 extends from the front of vehicle 100 to approximately 15 meters ahead of vehicle 100, and the second detection region 330 extends from about 15 meters ahead of vehicle 100 to about 50 meters ahead of vehicle 100.

As indicated on the left side of FIG. 3 (the top view), the first detection region 320 (the triangle-shaped region) extends from the front of vehicle 100 to a predetermined distance ahead of vehicle 100. In this particular embodiment, second detection region 330 (the oval-shaped region) extends from that predetermined distance farther ahead down the roadway 350 to a second predetermined distance. As those skilled in the art are aware, feature detection in the first detection region 320 (near detection region) tends to be more reliable than in the second detection region 330 (far detection region) because the first detection region 320 is closer to vehicle 100, and features such as lane markings 340 tend to be in sharper focus in that region. Nevertheless, the embodiments discussed herein take advantage of the usefulness of feature detection in the second detection region (far detection region), as explained further below. Feature detection module 220 can store the results of feature detection in database 260.

There are a number of phenomena that can interfere with successful feature detection. For example, lane markings can be difficult to detect when the roadway is covered with a pool or puddle of water. Other conditions that can make lane markings difficult to detect include fog, fallen leaves covering the roadway, backlight (the sun shining directly into the forward-facing cameras), road damage (cracks, potholes, etc.), dark tunnels (lack of light for the optical cameras), faded painted lines, or lines that are missing altogether. For other types of features such as curbs, poles, walls, or traffic signs, there are environmental conditions, known to those skilled in the art, that can interfere with the detection of those features, as well. Fog is one example. The various conditions that cause feature detection to be inaccurate can ultimately result in localization failure—the failure of vehicle 100 to determine its current position accurately relative to map data 116 (see FIG. 1). When localization fails, a transition from the autonomous driving mode to the manual driving mode (i.e., a handover) results. Another important condition that can result in localization failure and handover is road construction. In such a case, the roadway might be modified (lanes diverted or closed, etc.) relative to what is shown in map data 116.

Figure 4:
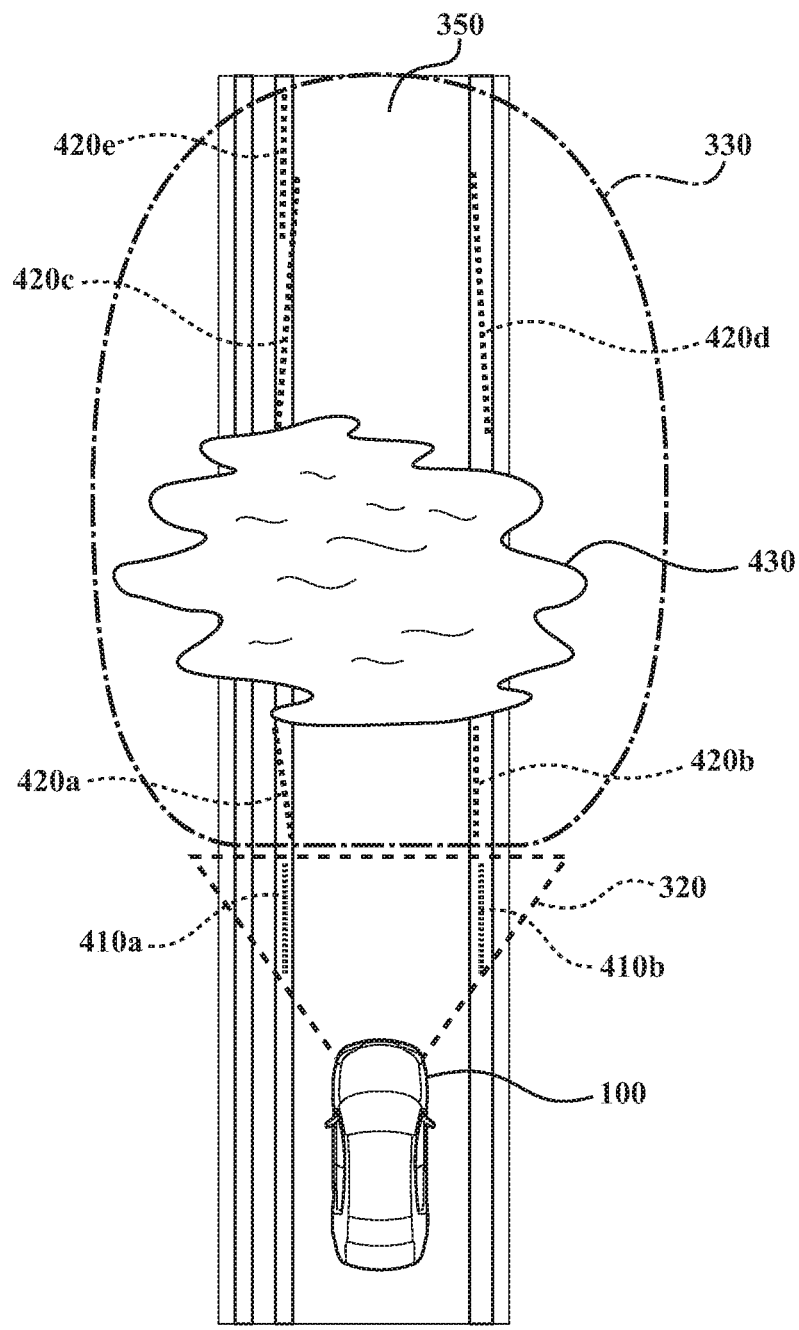
FIG. 4 illustrates feature detection in the first and second detection regions at a current vehicle position, in accordance with an illustrative embodiment of the invention.

FIG. 4 illustrates feature detection in the first and second detection regions at a current vehicle position, in accordance with an illustrative embodiment of the invention. In FIG. 4, from the perspective of the current location of vehicle 100 (the location depicted in FIG. 4), feature detection module 220 detects features within first detection region 320. In this example, feature detection module 220 detects features 410a and 410b, which, in this example, are segments of lane markings 340. Feature detection module 220 also detects features farther ahead in the second detection region 330. In this example, those features include features 420a-e. Those features detected in the second detection region 330 are also segments of lane markings 340, in this example. As illustrated in FIG. 4, features such as 420a-e detected within second detection region 330 may be less precise relative to map data 116 than the features 410a and 410b detected within first detection region 320. Note that puddle 430 interferes with the detection of lane markings in a portion of the scene within the second detection region 330.

The feature detection simulation module 230 generally includes instructions that function to control the one or more processors 110 to perform a process called "feature detection simulation" for the features detected by feature detection module 220 at a current position of vehicle 100. A central concept in the embodiments described herein is that, based on feature detection at the current location and simulation (calculations based on available data), feature detection and localization can be performed virtually for positions other than the vehicle's current position to anticipate where localization failures will occur before they occur. In this description, this virtual or simulated feature detection at positions other than the current position of vehicle 100 is called "feature detection simulation," and virtual or simulated localization at positions other than the current position of vehicle 100 is called "localization simulation." Localization simulation will be discussed in greater detail below in connection with localization simulation module 240.

Feature detection simulation module 230 performs feature detection simulation by determining, for each of one or more hypothetical positions ahead of the current position along a planned route, which features detected by feature detection module 220 at the current position of vehicle 100, if any, lie within the first detection region at that hypothetical position. A hypothetical position is a position ahead along the planned route that vehicle 100 has not yet reached. It is selected for calculational purposes—for the purposes of feature detection simulation—as a "virtual position" of vehicle 100. Feature detection simulation can be more clearly understood through the example shown in FIGS. 5A-5C.

Figure 5C:
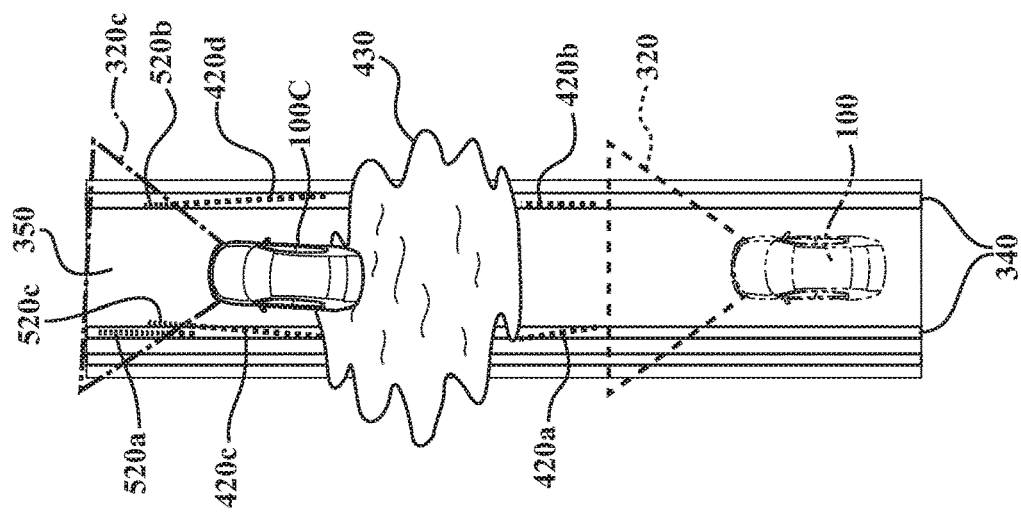
FIGS. 5A-5C illustrate feature detection simulation at three different hypothetical vehicle positions, in accordance with an illustrative embodiment of the invention.
Figure 5B:
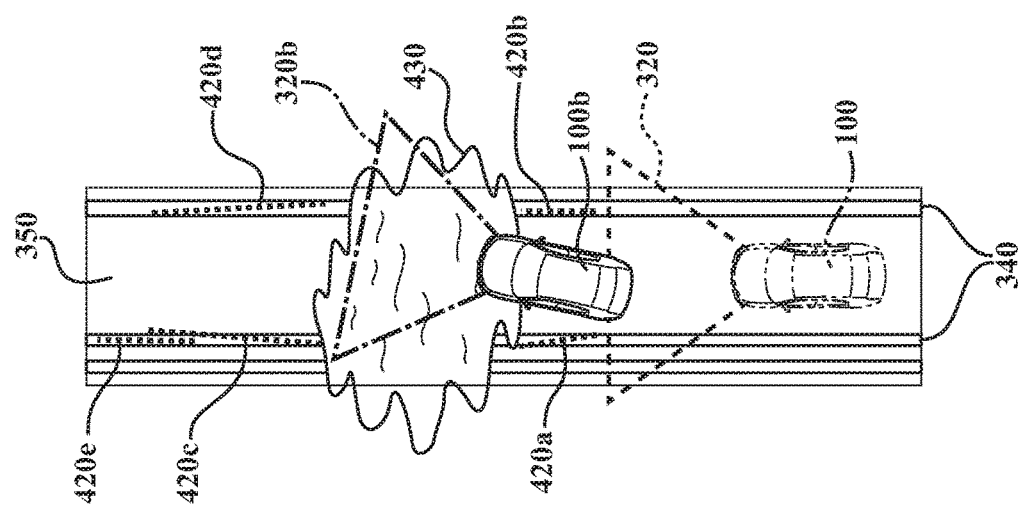
Figure 5A:
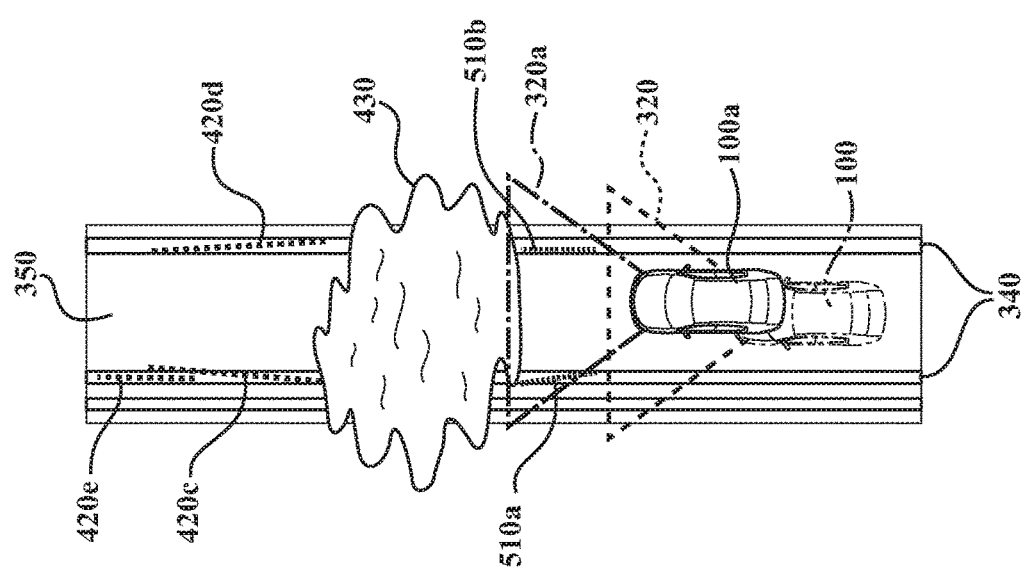

FIGS. 5A-5C illustrate feature detection simulation at three different hypothetical vehicle positions, in accordance with an illustrative embodiment of the invention. In FIGS. 5A-5C, vehicle 100 is shown at its current position, as in FIG. 4, and additionally at each of three hypothetical positions farther ahead along the planned route. Those hypothetical positions, for purposes of this description, are called "Position A," "Position B," and "Position C," corresponding to FIGS. 5A, 5B, and 5C, respectively. In FIGS. 5A-5C, reference numeral 320 corresponds to the first detection region at the current location of vehicle 100 (the location at which the feature detection described above and illustrated in FIG. 4 was performed). At hypothetical Positions A, B, and C, an "a," "b," or "c" suffix, respectively, is added to reference numerals 100 and 320 to identify vehicle 100 and the first detection region 320 at each of those hypothetical positions.

At Position A in FIG. 5A, feature detection simulation module 230 determines that features 510a and 510b (segments of lane markings 340) would be detected within first detection region 320a. At Position B in FIG. 5B, feature detection simulation module 230 determines that no features can be detected within first detection region 320b (due to puddle 430). At Position C in FIG. 5C, feature detection simulation module 230 determines that features 520a-c (segments of lane markings 340) would be detected within first detection region 320c.

Selection of the hypothetical vehicle positions for feature detection simulation can vary, depending on the embodiment. In one embodiment, the hypothetical positions are chosen randomly along the vehicle's planned route. In another embodiment, the hypothetical positions are spaced at regular intervals based on time (e.g., every 0.1 seconds) or distance (e.g., every 1.0 meters). In yet another embodiment, vehicle 100 is hypothetically positioned near an obstacle such as puddle 430 or another obstacle (fog, fallen leaves, etc.). In one embodiment, hypothetical positions are chosen to coincide with changes in the features of the roadway. For example, a hypothetical position can be chosen to coincide with an intersection, the number of lanes changing, or the beginning or end of a grade (slope). In other embodiments, these techniques for choosing the hypothetical positions can be combined.

Once feature detection simulation module 230 has completed feature detection simulation with respect to the current position of vehicle 100, the results are output to localization simulation module 240 and can be stored in database 260.

The localization simulation module 240 generally includes instructions that function to control the one or more processors 110 to perform the "localization simulation" process mentioned above. Localization simulation involves performing localization for each of the hypothetical positions selected during feature detection simulation.

An example of localization simulation is illustrated in FIGS. 6A-6C. As with FIGS. 5A-5C, FIGS. 6A-6C correspond, respectively, to the illustrative hypothetical Positions A, B, and C. In each of FIGS. 6A-6C, the illustration on the left shows the features detected at the indicated vehicle position, and the illustration on the right shows the corresponding map data 610 and the impact on localization of the detected features (or of the failure to detect features). At Position A in FIG. 6A, localization with respect to map 610 succeeds because of the successful detection of features 510a and 510b within first detection region 320a during feature detection simulation. At Position B in FIG. 6B, localization fails because feature detection simulation was unsuccessful at that hypothetical position (i.e., no features were detected within first detection region 320b). At Position C in FIG. 6C, localization succeeds because of the successful detection of features 520a-c within first detection region 320c during feature detection simulation.

Upon completing localization simulation, localization simulation module 240 outputs the results of localization simulation, in particular hypothetical positions at which localization failed, to driving-mode control module 250. The results of localization simulation can also be stored in database 260.

How many features (e.g., segments of lane markings 340) need to be detected within first detection region 320 for localization to succeed can vary, depending on the particular embodiment. That is, how many detected features are deemed sufficient for successful localization can vary. In some embodiments, not detecting any features at all within first detection region 320 (like the situation involving puddle 430 at hypothetical Position B in FIG. 6B) is deemed insufficient for successful localization. In other embodiments, detecting one feature (e.g., a segment of a lane marking 340 on one side of the roadway) might be deemed sufficient for localization to succeed, whereas, in other embodiments, localization simulation module 240 might require two features (e.g., both lane markings 340 delineating a lane) to be detected, and anything less than two features would be deemed insufficient for successful localization. Depending on the particular kinds of features being detected, other numbers of detected features besides zero, one, or two features might be relevant in defining the sufficiency of detected features for localization to succeed.

Figure 7:
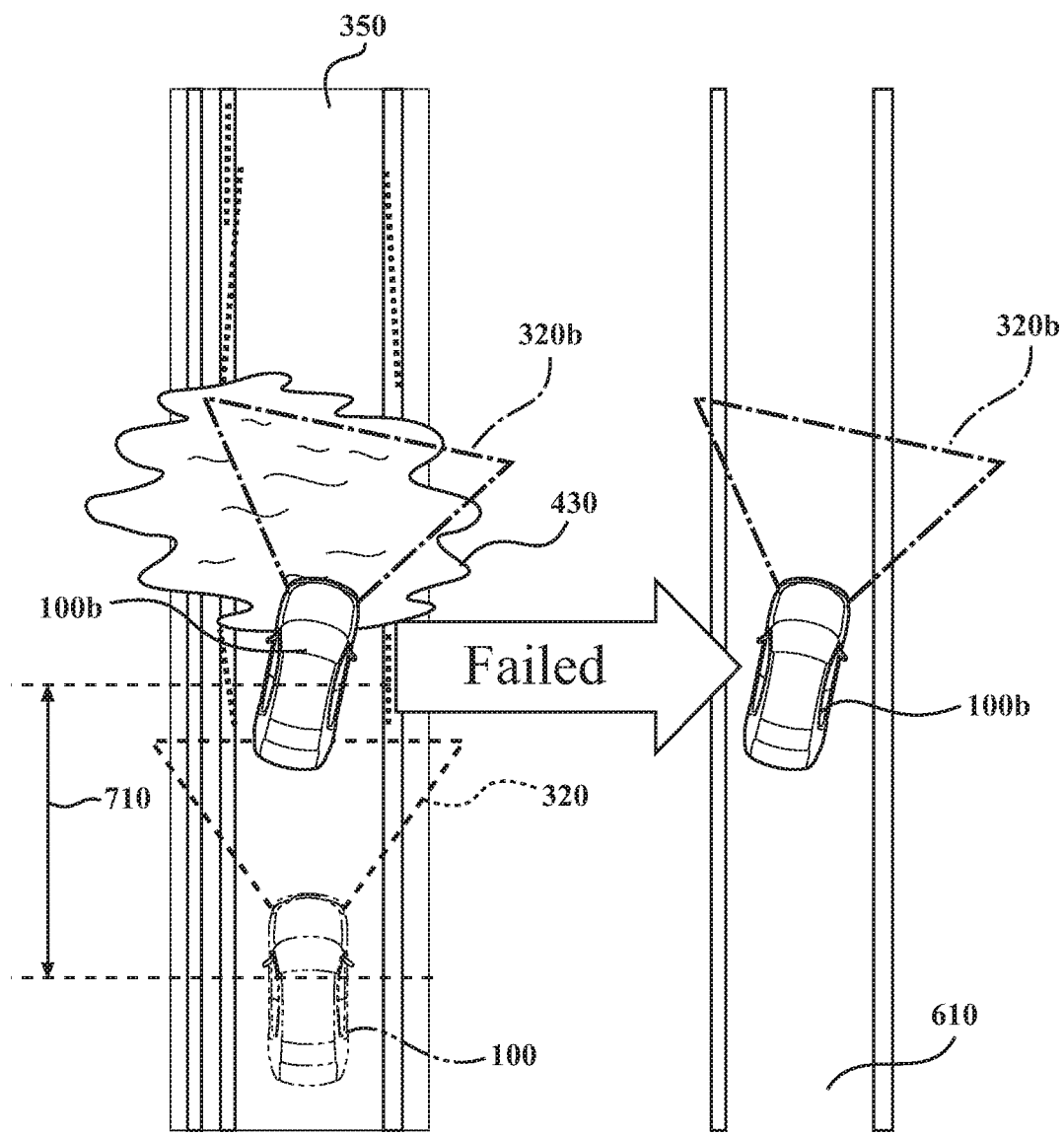
FIG. 7 illustrates computing the distance from a current vehicle position to a localization-failure position, in accordance with an illustrative embodiment of the invention.

In some embodiments, localization simulation module 240 also calculates the distance from the current position of vehicle 100 to a hypothetical position at which localization failed during localization simulation, as illustrated in FIG. 7. FIG. 7 corresponds to the situation in FIG. 6B (localization failure at hypothetical Position B). Such a position may be termed a "localization-failure position." In the embodiments just mentioned, localization simulation module 240 outputs, to driving-mode control module 250, the calculated distance 710 from the current position of vehicle 100 to Position B. In some embodiments, localization simulation module 240 identifies a plurality of localization-failure positions and computes a plurality of associated distances 710. That information is output to driving-mode control module 250 and can be stored in database 260.

The driving-mode control module 250 generally includes instructions that function to control the one or more processors 110 to initiate a transition from the autonomous driving mode to the manual driving mode based, at least in part, on one or more localization-failure positions received from localization simulation module 240. In other words, driving-mode control module 250 initiates a handover when the conditions necessitating a handover exist, and localization-failure positions identified through the techniques described above are part of the information that driving-mode control module 250 takes into account in making that determination. By the same token, in some embodiments, driving-mode control module 250 can also initiate a transition from the manual driving mode to the autonomous driving mode when localization simulation module 240 does not detect any localization-failure positions. That is, driving-mode control module 250 can initiate a transition from the manual driving mode to the autonomous driving mode in the absence of identified localization-failure positions.

In some embodiments, driving-mode control module 250 includes instructions to notify a driver/operator of the upcoming transition from the autonomous driving mode to the manual driving mode. This notification can be accomplished in a variety of ways such as an indicator light, a recorded audible notification, some form of tactile feedback, or some other kind of notification.

In embodiments in which localization simulation module 240 reports distances 710, driving-mode control module 250 can use that information to estimate the period of time until manual driving is to commence. For example, driving-mode control module 250 may determine that, based on the reported distance 710 to a localization-failure position and the current speed of vehicle 100, a handover must be completed within five seconds.

In some embodiments, feature detection simulation module 230 includes instructions to perform an additional process, termed "obstacles simulation," that can enhance the accuracy of feature detection simulation. Obstacles simulation involves predicting the position of one or more detected obstacles for one or more of the hypothetical positions of vehicle 100 selected for feature detection simulation. That is, for a given hypothetical position of vehicle 100, feature detection simulation module 230 estimates where a detected obstacle will be relative to that hypothetical position. Examples of obstacles include, without limitation, other vehicles, bicyclists, and pedestrians. As those skilled in the art understand, obstacles can be either stationary or moving. The position of a moving obstacle (e.g., another vehicle) relative to a hypothetical position of vehicle 100 can be estimated from the obstacle's current measured speed and heading. For example, if the time for vehicle 100 to travel from its current position to a hypothetical position is estimated to be 10 seconds, feature detection simulation module 230 can estimate where the detected obstacle will be in 10 seconds based on the detected obstacle's current measured speed and heading.

Figure 8A:
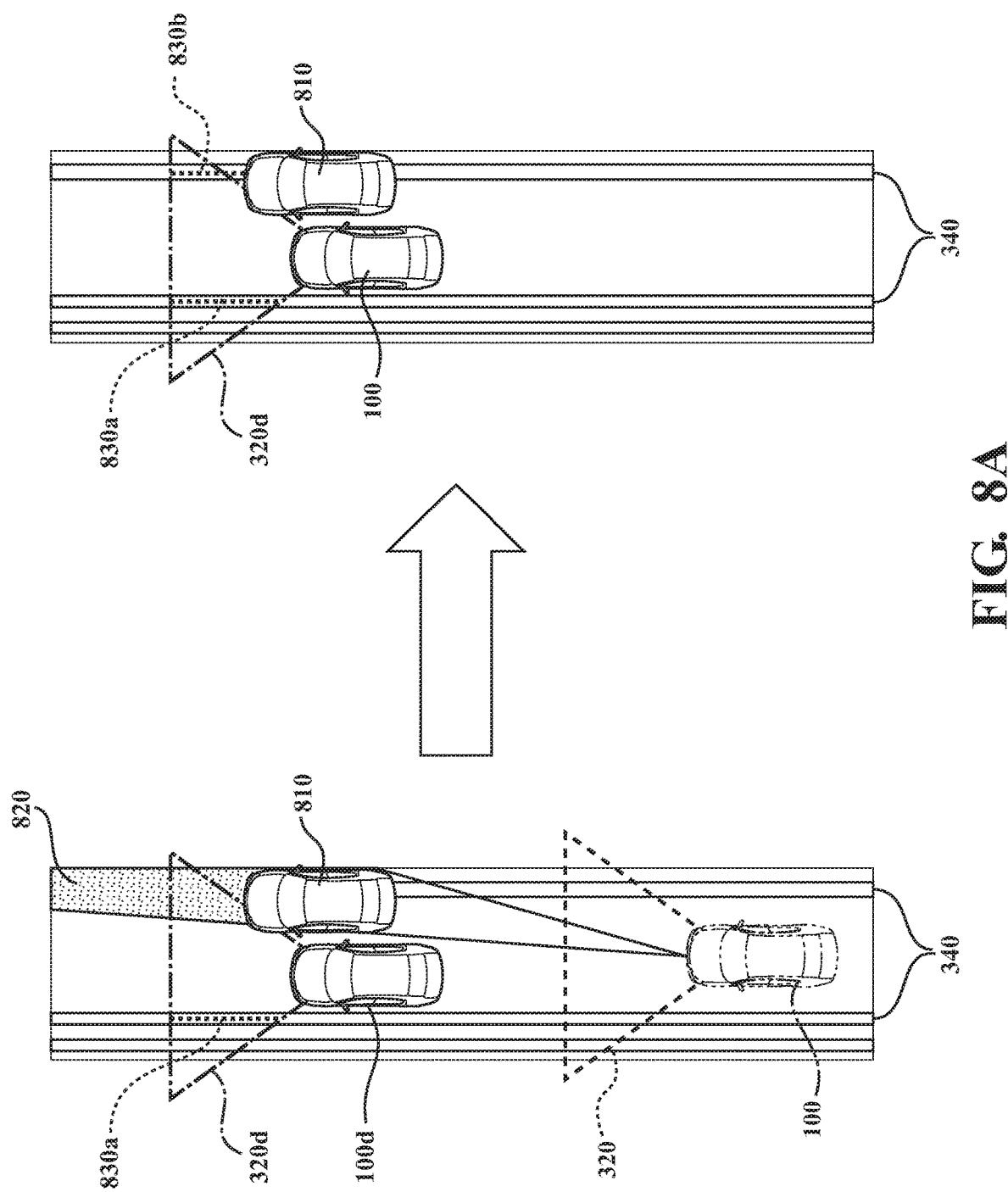

FIGS. 8A-8C illustrate some ways in which obstacles can affect feature detection and, ultimately, localization, in accordance with an illustrative embodiment of the invention. In performing obstacles simulation, feature detection simulation module 230 takes these kinds of circumstances into account. On the left side of FIG. 8A, vehicle 100 is labeled with reference numeral "100" at its current position and with "100d" at a hypothetical position selected for feature detection simulation. Obstacle 810 (a parked vehicle) prevents feature detection module 220 from detecting the right-shoulder lane marking 340 at the vehicle's current position. Consequently, in this example, feature detection simulation yields only one detected feature, feature 830a, within the first detection region 320d at the hypothetical position. However, as shown on the right side of FIG. 8A, when vehicle 100 actually reaches the hypothetical position, feature detection module 220 is able to detect the right-shoulder lane marking 340 (feature 830b) that was obscured by occlusion region 820 when vehicle 100 was at the position shown on the left side of FIG. 8A (the position originally referred to as the "current position").

A different scenario is depicted in FIG. 8B. On the left side of this figure, vehicle 100 is again labeled with reference numeral "100" at its current position and with "100e" at a hypothetical position selected for feature detection simulation. In this case, obstacle 840 is a stopping vehicle. At the vehicle's current position, feature detection module 220 expects and detects portions of lane markings 340 within second detection region 330 (not shown in FIG. 8B), and segments of those lane markings 340 (features 865a and 865b) lie within first detection region 320e at the hypothetical position when feature detection simulation module 230 performs feature detection simulation. The occlusion region 850 caused by obstacle 840 does not pose a problem at this stage. However, as shown on the right side of FIG. 8B, when vehicle 100 actually reaches the hypothetical position, the lane markings 340 that were detectable at the current position (left side of FIG. 8B) are no longer visible due to the effectively larger occlusion region 860 at that position.

Yet another scenario is depicted in FIG. 8C. On the left side of this figure, vehicle 100 is again labeled with reference numeral "100" at its current position and with "100f" at a hypothetical position selected for feature detection simulation. In this case, obstacle 870 is a moving vehicle. At the current position of vehicle 100, feature detection module 220 expects and detects portions of lane markings 340 within second detection region 330 (not shown in FIG. 8C), and segments of those lane markings 340 (features 880a and 880b) lie within first detection region 320f at the hypothetical position when feature detection simulation module 230 performs feature detection simulation. With respect to the current position of vehicle 100, obstacle 870 causes occlusion region 875. However, as shown on the right side of FIG. 8C, when vehicle 100 actually reaches the hypothetical position, the occlusion region due to moving obstacle 870 has become occlusion region 890, and one of the features detectable at the current position (left side of FIG. 8C), feature 880a, is not detectable at the new position.

Figure 9:
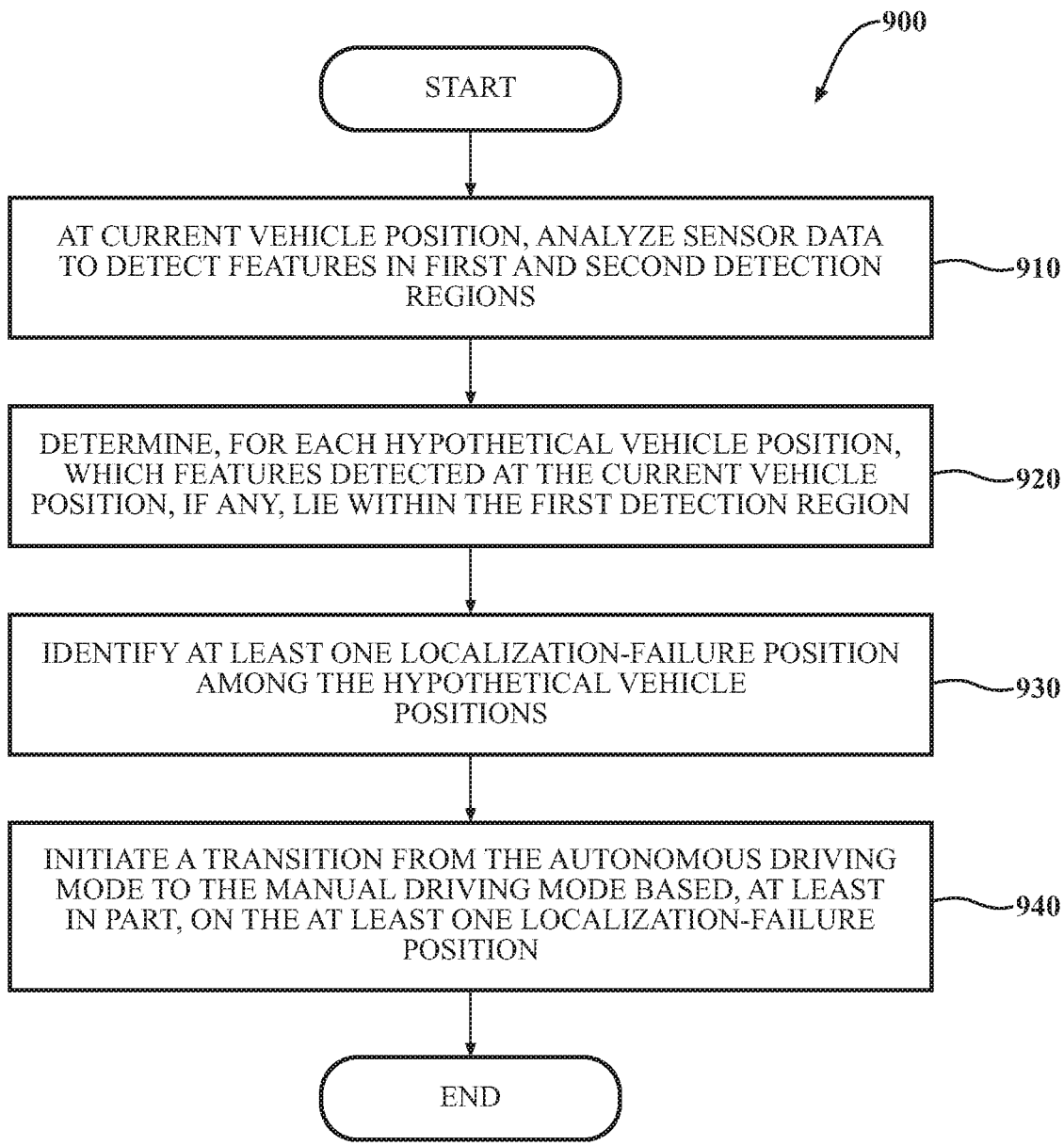
FIG. 9 is a flowchart of a method of transitioning a vehicle from an autonomous driving mode to a manual driving mode, in accordance with an illustrative embodiment of the invention.

FIG. 9 is a flowchart of a method 900 of transitioning a vehicle from an autonomous driving mode to a manual driving mode, in accordance with an illustrative embodiment of the invention. Method 900 will be discussed from the perspective of driving-mode transition system 170 in FIG. 2. While method 900 is discussed in combination with driving-mode transition system 170, it should be appreciated that method 900 is not limited to being implemented within driving-mode transition system 170, but driving-mode transition system 170 is instead one example of a system that may implement method 900.

At block 910, feature detection module 220, at the current position of vehicle 100, analyzes sensor data from sensor system 120 to detect features in first detection region 320 and second detection region 330. As discussed above, in some embodiments, the sensor data includes image data from one or more cameras 126, point-cloud data from one or more LIDAR sensors 124, or a combination of the two. In other embodiments, other types of sensors such as radar or sonar are used. Feature detection module 220 is capable of detecting various types of features on or near a roadway ahead of vehicle 100 such as, without limitation, lines (center lines, lane lines, etc.), curbs, poles, walls, or traffic signs.

At block 920, feature detection simulation module 230 determines, for each hypothetical position of vehicle 100, which features detected at the current position by feature detection module 220, if any, lie within first detection region 320 at that hypothetical position. As discussed above, a hypothetical position is a position ahead along the planned route that vehicle 100 has not yet reached. It is selected for calculational purposes—for the purposes of feature detection simulation—as a "virtual position" of vehicle 100.

At block 930, localization simulation module 240 identifies, among the one or more hypothetical positions selected for feature detection simulation, at least one localization-failure position at which localization of vehicle 100 will fail due to insufficient features being detected within the first detection region 320 at those localization-failure positions. As discussed above, the number of features (e.g., segments of lane markings 340) that need to be detected to be deemed sufficient for localization to succeed can differ, depending on the particular embodiment. In some embodiments, localization simulation module 240 requires that two features be detected (e.g., both lane markings 340 delineating a lane). In other embodiments, one detected feature (e.g., a segment of a lane marking 340 on one side of the roadway 350) is sufficient. In some embodiments, detecting no features at all within first detection region 320 at a particular hypothetical position is deemed insufficient for localization to succeed.

At block 940, driving-mode control module 250, having received the results of localization simulation from localization simulation module 240, initiates a transition from the autonomous driving mode to the manual driving mode based, at least in part, on the localization-failure position or positions reported by localization simulation module 240.

Figure 10:
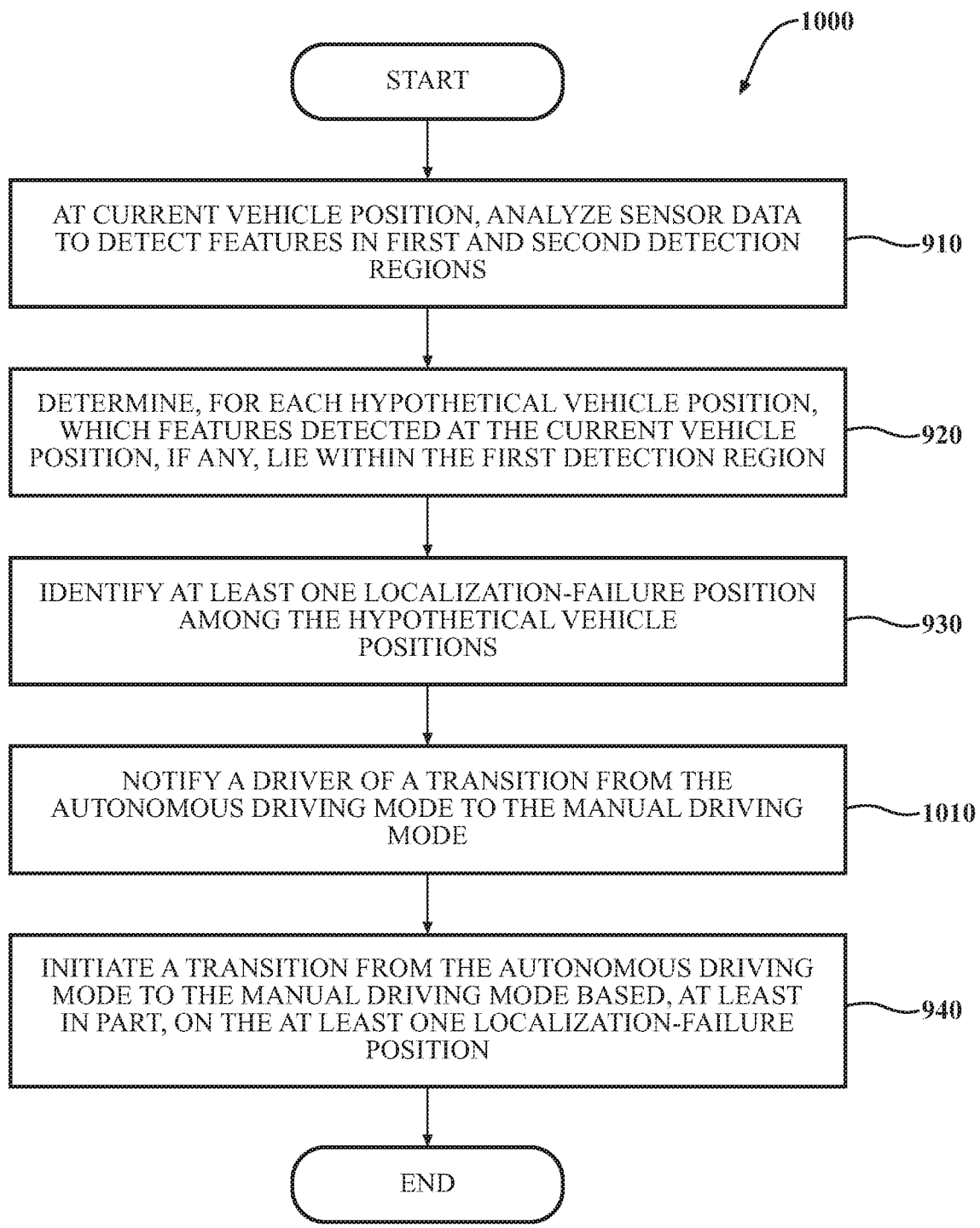
FIG. 10 is a flowchart of a method of transitioning a vehicle from an autonomous driving mode to a manual driving mode, in accordance with another illustrative embodiment of the invention.

FIG. 10 is a flowchart of a method 1000 of transitioning a vehicle from an autonomous driving mode to a manual driving mode, in accordance with another illustrative embodiment of the invention. Method 1000 is similar to method 900 discussed above in connection with FIG. 9, except that block 1010 has been added. At block 1010, driving-mode control module 250 notifies a driver of the transition from the autonomous driving mode to the manual driving mode. The embodiments described herein permit earlier notification of the driver because the conditions necessitating a handover (i.e., localization failure) are identified earlier as a result of detecting features in second detection region 330 (the far detection region) and performing feature detection simulation and localization simulation based on that data.

Figure 11:
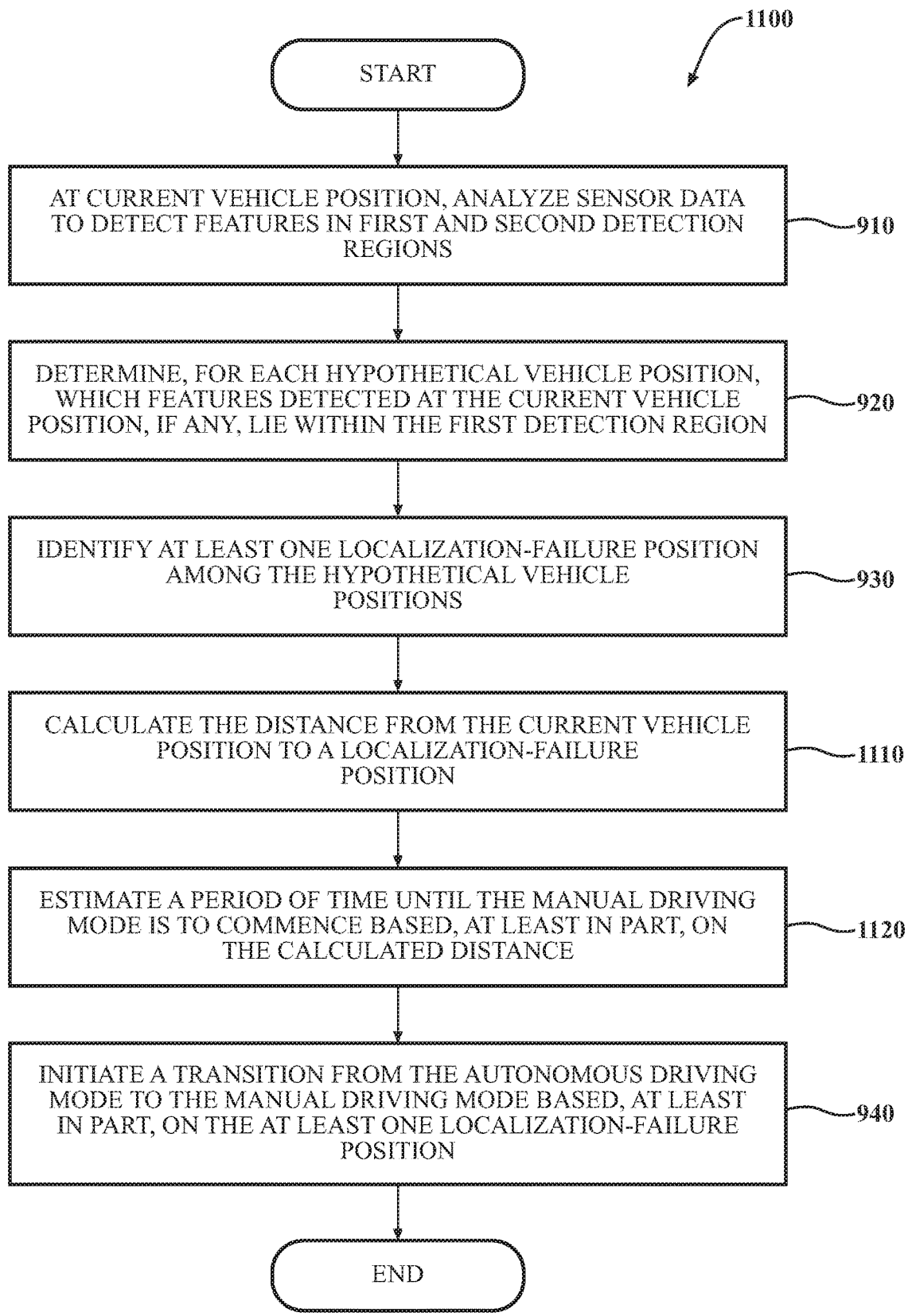
FIG. 11 is a flowchart of a method of transitioning a vehicle from an autonomous driving mode to a manual driving mode, in accordance with another illustrative embodiment of the invention.

FIG. 11 is a flowchart of a method 1100 of transitioning a vehicle from an autonomous driving mode to a manual driving mode, in accordance with another illustrative embodiment of the invention. Method 1100 is also similar to method 900, except that blocks 1110 and 1120 have been added. At block 1110, localization simulation module 240 calculates the distance from the current position of vehicle 100 to a localization-failure position, as discussed above. A localization-failure position is a hypothetical vehicle position selected for feature detection simulation at which localization failure occurs due to insufficient features being detected within first detection region 320 at that hypothetical position. At block 1120, driving-mode control module 250 estimates a time period until the manual driving mode is to commence based, at least in part, on the distance calculated by localization simulation module 240. This time period can be estimated based, for example, on the calculated distance and the known speed at which vehicle 100 is currently traveling.

Figure 12:
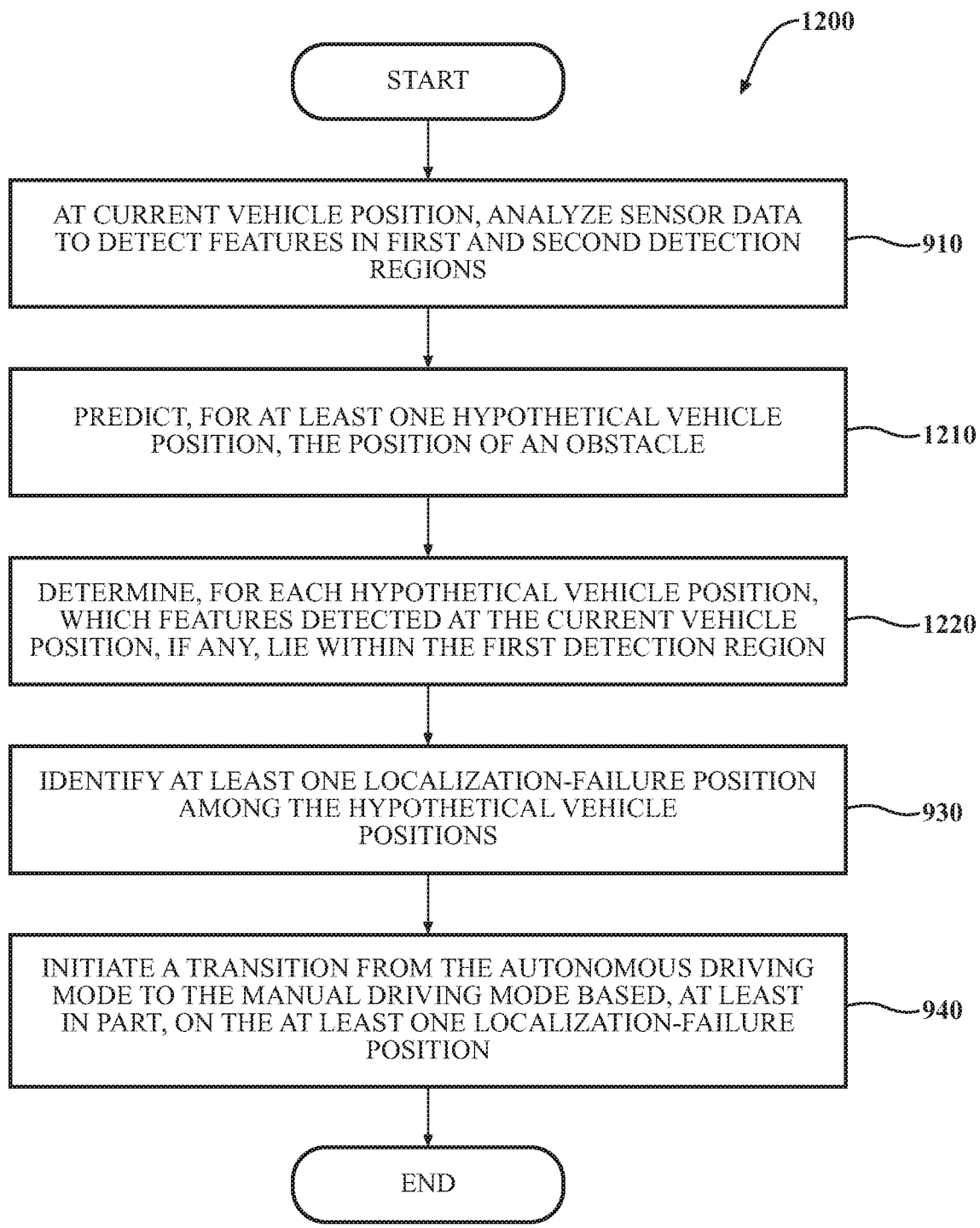
FIG. 12 is a flowchart of a method of transitioning a vehicle from an autonomous driving mode to a manual driving mode, in accordance with yet another illustrative embodiment of the invention.

FIG. 12 is a flowchart of a method 1200 of transitioning a vehicle from an autonomous driving mode to a manual driving mode, in accordance with yet another illustrative embodiment of the invention. Method 1200 is also similar to method 900, except that blocks 1210 and 1220 have been added. At block 1210, feature detection simulation module 230 predicts, for at least one hypothetical position of vehicle 100, the corresponding position of one or more detected obstacles (e.g., other vehicles, bicyclists, pedestrians). Such an estimate can be based, for example, on the current measured speed and heading of an obstacle. Block 1220 is related to block 920 in FIG. 9, but since feature detection simulation module 230 estimates the positions of obstacles and takes those estimated positions into account in performing feature detection simulation in this embodiment, a different reference numeral (1220) has been used to label this portion of method 1200.

As discussed above, in some embodiments, driving-mode control module 250 can also initiate a transition from the manual driving mode to the autonomous driving mode when localization simulation module 240 does not detect any localization-failure positions for a relevant portion of the roadway. That is, driving-mode control module 250 can initiate a transition from the manual driving mode to the autonomous driving mode in response to the absence of identified localization-failure positions. Any of methods 900, 1000, 1100, and 1200 described above can be modified in this way to include transitioning from the manual driving mode to the autonomous driving mode.

FIG. 1 will now be discussed in full detail as an example vehicle environment within which the system and methods disclosed herein may operate. In some instances, the vehicle 100 is configured to switch selectively between an autonomous mode, one or more semi-autonomous operational modes, and/or a manual mode. Such switching also referred to as handover when transitioning to a manual mode can be implemented in a suitable manner, now known or later developed. "Manual mode" means that all of or a majority of the navigation and/or maneuvering of the vehicle is performed according to inputs received from a user (e.g., human driver/operator).

In one or more embodiments, the vehicle 100 is an autonomous vehicle. As used herein, "autonomous vehicle" refers to a vehicle that operates in an autonomous mode. "Autonomous mode" refers to navigating and/or maneuvering the vehicle 100 along a travel route using one or more computing systems to control the vehicle 100 with minimal or no input from a human driver/operator. In one or more embodiments, the vehicle 100 is highly automated or completely automated. In one embodiment, the vehicle 100 is configured with one or more semi-autonomous operational modes in which one or more computing systems perform a portion of the navigation and/or maneuvering of the vehicle along a travel route, and a vehicle operator (i.e., driver) provides inputs to the vehicle to perform a portion of the navigation and/or maneuvering of the vehicle 100 along a travel route. Thus, in one or more embodiments, the vehicle 100 operates autonomously according to a particular defined level of autonomy. For example, the vehicle 100 can operate according to the Society of Automotive Engineers (SAE) automated vehicle classifications 0-5. In one embodiment, the vehicle 100 operates according to SAE level 2, which provides for the autonomous driving module 160 controlling the vehicle 100 by braking, accelerating, and steering without operator input but the driver/operator is to monitor the driving and be vigilant and ready to intervene with controlling the vehicle 100 if the autonomous module 160 fails to properly respond or is otherwise unable to adequately control the vehicle 100.

The vehicle 100 can include one or more processors 110. In one or more arrangements, the processor(s) 110 can be a main processor of the vehicle 100. For instance, the processor(s) 110 can be an electronic control unit (ECU). The vehicle 100 can include one or more data stores 115 for storing one or more types of data. The data store 115 can include volatile and/or non-volatile memory. Examples of suitable data stores 115 include RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The data store 115 can be a component of the processor(s) 110, or the data store 115 can be operably connected to the processor(s) 110 for use thereby. The term "operably connected," as used throughout this description, can include direct or indirect connections, including connections without direct physical contact.

In one or more arrangements, the one or more data stores 115 can include map data 116. The map data 116 can include maps of one or more geographic areas. In some instances, the map data 116 can include information or data on roads, traffic control devices, road markings, structures, features, and/or landmarks in the one or more geographic areas. The map data 116 can be in any suitable form. In some instances, the map data 116 can include aerial views of an area. In some instances, the map data 116 can include ground views of an area, including 360-degree ground views. The map data 116 can include measurements, dimensions, distances, and/or information for one or more items included in the map data 116 and/or relative to other items included in the map data 116. The map data 116 can include a digital map with information about road geometry. The map data 116 can be high quality and/or highly detailed.

In one or more arrangement, the map data 116 can include one or more terrain maps 117. The terrain map(s) 117 can include information about the ground, terrain, roads, surfaces, and/or other features of one or more geographic areas. The terrain map(s) 117 can include elevation data in the one or more geographic areas. The map data 116 can be high quality and/or highly detailed. The terrain map(s) 117 can define one or more ground surfaces, which can include paved roads, unpaved roads, land, and other things that define a ground surface.

In one or more arrangement, the map data 116 can include one or more static obstacle maps 118. The static obstacle map(s) 118 can include information about one or more static obstacles located within one or more geographic areas. A "static obstacle" is a physical object whose position does not change or substantially change over a period of time and/or whose size does not change or substantially change over a period of time. Examples of static obstacles include trees, buildings, curbs, fences, railings, medians, utility poles, statues, monuments, signs, benches, furniture, mailboxes, large rocks, hills. The static obstacles can be objects that extend above ground level. The one or more static obstacles included in the static obstacle map(s) 118 can have location data, size data, dimension data, material data, and/or other data associated with it. The static obstacle map(s) 118 can include measurements, dimensions, distances, and/or information for one or more static obstacles. The static obstacle map(s) 118 can be high quality and/or highly detailed. The static obstacle map(s) 118 can be updated to reflect changes within a mapped area.

The one or more data stores 115 can include sensor data 119. In this context, "sensor data" means any information about the sensors that the vehicle 100 is equipped with, including the capabilities and other information about such sensors. As will be explained below, the vehicle 100 can include the sensor system 120. The sensor data 119 can relate to one or more sensors of the sensor system 120. As an example, in one or more arrangements, the sensor data 119 can include information on one or more LIDAR sensors 124 of the sensor system 120.

In some instances, at least a portion of the map data 116 and/or the sensor data 119 can be located in one or more data stores 115 located onboard the vehicle 100. Alternatively, or in addition, at least a portion of the map data 116 and/or the sensor data 119 can be located in one or more data stores 115 that are located remotely from the vehicle 100.

As noted above, the vehicle 100 can include the sensor system 120. The sensor system 120 can include one or more sensors. "Sensor" means any device, component and/or system that can detect, and/or sense something. The one or more sensors can be configured to detect, and/or sense in real-time. As used herein, the term "real-time" means a level of processing responsiveness that a user or system senses as sufficiently immediate for a particular process or determination to be made, or that enables the processor to keep up with some external process.

In arrangements in which the sensor system 120 includes a plurality of sensors, the sensors can function independently from each other. Alternatively, two or more of the sensors can work in combination with each other. In such a case, the two or more sensors can form a sensor network. The sensor system 120 and/or the one or more sensors can be operably connected to the processor(s) 110, the data store(s) 115, and/or another element of the vehicle 100 (including any of the elements shown in FIG. 1). The sensor system 120 can acquire data of at least a portion of the external environment of the vehicle 100 (e.g., nearby vehicles).

The sensor system 120 can include any suitable type of sensor. Various examples of different types of sensors will be described herein. However, it will be understood that the embodiments are not limited to the particular sensors described. The sensor system 120 can include one or more vehicle sensors 121. The vehicle sensor(s) 121 can detect, determine, and/or sense information about the vehicle 100 itself. In one or more arrangements, the vehicle sensor(s) 121 can be configured to detect, and/or sense position and orientation changes of the vehicle 100, such as, for example, based on inertial acceleration. In one or more arrangements, the vehicle sensor(s) 121 can include one or more accelerometers, one or more gyroscopes, an inertial measurement unit (IMU), a dead-reckoning system, a global navigation satellite system (GNSS), a global positioning system (GPS), a navigation system 147, and/or other suitable sensors. The vehicle sensor(s) 121 can be configured to detect, and/or sense one or more characteristics of the vehicle 100. In one or more arrangements, the vehicle sensor(s) 121 can include a speedometer to determine a current speed of the vehicle 100.

Alternatively, or in addition, the sensor system 120 can include one or more environment sensors 122 configured to acquire, and/or sense driving environment data. "Driving environment data" includes and data or information about the external environment in which an autonomous vehicle is located or one or more portions thereof. For example, the one or more environment sensors 122 can be configured to detect, quantify and/or sense obstacles in at least a portion of the external environment of the vehicle 100 and/or information/data about such obstacles. Such obstacles may be stationary objects and/or dynamic objects. The one or more environment sensors 122 can be configured to detect, measure, quantify and/or sense other things in the external environment of the vehicle 100, such as, for example, lane markers, signs, traffic lights, traffic signs, lane lines, crosswalks, curbs proximate the vehicle 100, off-road objects, etc.

Various examples of sensors of the sensor system 120 will be described herein. The example sensors may be part of the one or more environment sensors 122 and/or the one or more vehicle sensors 121. Moreover, the sensor system 120 can include operator sensors that function to track or otherwise monitor aspects related to the driver/operator of the vehicle 100. However, it will be understood that the embodiments are not limited to the particular sensors described.

As an example, in one or more arrangements, the sensor system 120 can include one or more radar sensors 123, one or more LIDAR sensors 124, one or more sonar sensors 125, and/or one or more cameras 126. In one or more arrangements, the one or more cameras 126 can be high dynamic range (HDR) cameras, infrared (IR) cameras and so on. In one embodiment, the cameras 126 include one or more cameras disposed within a passenger compartment of the vehicle for performing eye-tracking on the operator/driver in order to determine a gaze of the operator/driver, an eye track of the operator/driver, and so on.

The vehicle 100 can include an input system 130. An "input system" includes any device, component, system, element or arrangement or groups thereof that enable information/data to be entered into a machine. The input system 130 can receive an input from a vehicle passenger (e.g. a driver or a passenger). The vehicle 100 can include an output system 135. An "output system" includes any device, component, or arrangement or groups thereof that enable information/data to be presented to a vehicle passenger (e.g. a person, a vehicle passenger, etc.).

The vehicle 100 can include one or more vehicle systems 140. Various examples of the one or more vehicle systems 140 are shown in FIG. 1. However, the vehicle 100 can include more, fewer, or different vehicle systems. It should be appreciated that although particular vehicle systems are separately defined, each or any of the systems or portions thereof may be otherwise combined or segregated via hardware and/or software within the vehicle 100. The vehicle 100 can include a propulsion system 141, a braking system 142, a steering system 143, throttle system 144, a transmission system 145, a signaling system 146, and/or a navigation system 147. Each of these systems can include one or more devices, components, and/or combination thereof, now known or later developed.

The navigation system 147 can include one or more devices, sensors, applications, and/or combinations thereof, now known or later developed, configured to determine the geographic location of the vehicle 100 and/or to determine a travel route for the vehicle 100. The navigation system 147 can include one or more mapping applications to determine a travel route for the vehicle 100. The navigation system 147 can include a global positioning system, a local positioning system or a geolocation system.

The processor(s) 110, the driving-mode transition system 170, and/or the autonomous driving module(s) 160 can be operably connected to communicate with the various vehicle systems 140 and/or individual components thereof. For example, returning to FIG. 1, the processor(s) 110 and/or the autonomous driving module(s) 160 can be in communication to send and/or receive information from the various vehicle systems 140 to control the movement, speed, maneuvering, heading, direction, etc. of the vehicle 100. The processor(s) 110, the driving-mode transition system 170, and/or the autonomous driving module(s) 160 may control some or all of these vehicle systems 140 and, thus, may be partially or fully autonomous.

The processor(s) 110, the driving-mode transition system 170, and/or the autonomous driving module(s) 160 can be operably connected to communicate with the various vehicle systems 140 and/or individual components thereof. For example, returning to FIG. 1, the processor(s) 110, the driving-mode transition system 170, and/or the autonomous driving module(s) 160 can be in communication to send and/or receive information from the various vehicle systems 140 to control the movement, speed, maneuvering, heading, direction, etc. of the vehicle 100. The processor(s) 110, the driving-mode transition system 170, and/or the autonomous driving module(s) 160 may control some or all of these vehicle systems 140.

The processor(s) 110, the driving-mode transition system 170, and/or the autonomous driving module(s) 160 may be operable to control the navigation and/or maneuvering of the vehicle 100 by controlling one or more of the vehicle systems 140 and/or components thereof. For instance, when operating in an autonomous mode, the processor(s) 110, the driving-mode transition system 170, and/or the autonomous driving module(s) 160 can control the direction and/or speed of the vehicle 100. The processor(s) 110, the driving-mode transition system 170, and/or the autonomous driving module(s) 160 can cause the vehicle 100 to accelerate (e.g., by increasing the supply of fuel provided to the engine), decelerate (e.g., by decreasing the supply of fuel to the engine and/or by applying brakes) and/or change direction (e.g., by turning the front two wheels). As used herein, "cause" or "causing" means to make, force, compel, direct, command, instruct, and/or enable an event or action to occur or at least be in a state where such event or action may occur, either in a direct or indirect manner.

The vehicle 100 can include one or more actuators 150. The actuators 150 can be any element or combination of elements operable to modify, adjust and/or alter one or more of the vehicle systems 140 or components thereof to responsive to receiving signals or other inputs from the processor(s) 110 and/or the autonomous driving module(s) 160. Any suitable actuator can be used. For instance, the one or more actuators 150 can include motors, pneumatic actuators, hydraulic pistons, relays, solenoids, and/or piezoelectric actuators, just to name a few possibilities.

The vehicle 100 can include one or more modules, at least some of which are described herein. The modules can be implemented as computer-readable program code that, when executed by a processor 110, implement one or more of the various processes described herein. One or more of the modules can be a component of the processor(s) 110, or one or more of the modules can be executed on and/or distributed among other processing systems to which the processor(s) 110 is operably connected. The modules can include instructions (e.g., program logic) executable by one or more processor(s) 110. Alternatively, or in addition, one or more data store 115 may contain such instructions.

In one or more arrangements, one or more of the modules described herein can include artificial or computational intelligence elements, e.g., neural network, fuzzy logic or other machine learning algorithms. Further, in one or more arrangements, one or more of the modules can be distributed among a plurality of the modules described herein. In one or more arrangements, two or more of the modules described herein can be combined into a single module.

The vehicle 100 can include one or more autonomous driving modules 160. The autonomous driving module(s) 160 can be configured to receive data from the sensor system 120 and/or any other type of system capable of capturing information relating to the vehicle 100 and/or the external environment of the vehicle 100. In one or more arrangements, the autonomous driving module(s) 160 can use such data to generate one or more driving scene models. The autonomous driving module(s) 160 can determine position and velocity of the vehicle 100. The autonomous driving module(s) 160 can determine the location of obstacles, or other environmental features including traffic signs, trees, shrubs, neighboring vehicles, pedestrians, etc.

The autonomous driving module(s) 160 can be configured to receive, and/or determine location information for obstacles within the external environment of the vehicle 100 for use by the processor(s) 110, and/or one or more of the modules described herein to estimate position and orientation of the vehicle 100, vehicle position in global coordinates based on signals from a plurality of satellites, or any other data and/or signals that could be used to determine the current state of the vehicle 100 or determine the position of the vehicle 100 with respect to its environment for use in either creating a map or determining the position of the vehicle 100 in respect to map data.

The autonomous driving module(s) 160 either independently or in combination with the driving-mode transition system 170 can be configured to determine travel path(s), current autonomous driving maneuvers for the vehicle 100, future autonomous driving maneuvers and/or modifications to current autonomous driving maneuvers based on data acquired by the sensor system 120, driving scene models, and/or data from any other suitable source. "Driving maneuver" means one or more actions that affect the movement of a vehicle. Examples of driving maneuvers include: accelerating, decelerating, braking, turning, moving in a lateral direction of the vehicle 100, changing travel lanes, merging into a travel lane, and/or reversing, just to name a few possibilities. The autonomous driving module(s) 160 can be configured can be configured to implement determined driving maneuvers. The autonomous driving module(s) 160 can cause, directly or indirectly, such autonomous driving maneuvers to be implemented. As used herein, "cause" or "causing" means to make, command, instruct, and/or enable an event or action to occur or at least be in a state where such event or action may occur, either in a direct or indirect manner. The autonomous driving module(s) 160 can be configured to execute various vehicle functions and/or to transmit data to, receive data from, interact with, and/or control the vehicle 100 or one or more systems thereof (e.g. one or more of vehicle systems 140).

Detailed embodiments are disclosed herein. However, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-12, but the embodiments are not limited to the illustrated structure or application.

The flowcharts and block diagrams in the figures illustrate the architecture, functionality, and operation of possible implementations of systems, methods and computer program products according to various embodiments. In this regard, each block in the flowcharts or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved.

The systems, components and/or processes described above can be realized in hardware or a combination of hardware and software and can be realized in a centralized fashion in one processing system or in a distributed fashion where different elements are spread across several interconnected processing systems. Any kind of processing system or another apparatus adapted for carrying out the methods described herein is suited. A typical combination of hardware and software can be a processing system with computer-usable program code that, when being loaded and executed, controls the processing system such that it carries out the methods described herein. The systems, components and/or processes also can be embedded in a computer-readable storage, such as a computer program product or other data programs storage device, readable by a machine, tangibly embodying a program of instructions executable by the machine to perform methods and processes described herein. These elements also can be embedded in an application product which comprises all the features enabling the implementation of the methods described herein and, which when loaded in a processing system, is able to carry out these methods.

Furthermore, arrangements described herein may take the form of a computer program product embodied in one or more computer-readable media having computer-readable program code embodied, e.g., stored, thereon. Any combination of one or more computer-readable media may be utilized. The computer-readable medium may be a computer-readable signal medium or a computer-readable storage medium. The phrase "computer-readable storage medium" means a non-transitory storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: a portable computer diskette, a hard disk drive (HDD), a solid-state drive (SSD), a read-only memory (ROM), an erasable programmable read-only memory (EPROM or Flash memory), a portable compact disc read-only memory (CD-ROM), a digital versatile disc (DVD), an optical storage device, a magnetic storage device, or any suitable combination of the foregoing. In the context of this document, a computer-readable storage medium may be any tangible medium that can contain or store a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present arrangements may be written in any combination of one or more programming languages, including an object-oriented programming language such as Java™ Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . ." as used herein refers to and encompasses any and all possible combinations of one or more of the associated listed items. As an example, the phrase "at least one of A, B, and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope hereof.

What is claimed is:

1. A system for transitioning a vehicle from an autonomous driving mode to a manual driving mode, the system comprising:
    one or more sensors;
    one or more processors;
    a memory communicably coupled to the one or more processors and storing:
        a feature detection module including instructions that when executed by the one or more processors cause the one or more processors to analyze data from the one or more sensors to detect, at a current position of the vehicle, features ahead of the vehicle in a first detection region and a second detection region, wherein the second detection region extends farther ahead of the vehicle along a direction of travel than the first detection region;
        a feature detection simulation module including instructions that when executed by the one or more processors cause the one or more processors to determine, for each of a plurality of hypothetical positions ahead of the current position along a planned route, which features detected at the current position, if any, lie within the first detection region at that hypothetical position, wherein the plurality of hypothetical positions are at least one of randomly selected, spaced at regular intervals, and selected to coincide with a change in features of a roadway along the planned route, the change in features including one of an intersection, a change in a number of lanes, a beginning of a grade, and an end of a grade;
        a localization simulation module including instructions that when executed by the one or more processors cause the one or more processors to identify, among the plurality of hypothetical positions, at least one localization-failure position at which localization of the vehicle will fail due to insufficient features being detected within the first detection region at the at least one localization-failure position; and
        a driving-mode control module including instructions that when executed by the one or more processors cause the one or more processors to:
            receive, from the localization simulation module, the at least one localization-failure position; and
            initiate a transition from the autonomous driving mode to the manual driving mode based, at least in part, on the at least one localization-failure position.

2. The system of claim 1, wherein the driving-mode control module further includes instructions to notify a driver of the transition from the autonomous driving mode to the manual driving mode.

3. The system of claim 1, wherein the localization simulation module further includes instructions to:
    calculate a distance from the current position of the vehicle to a localization-failure position and;
    output the distance to the driving-mode control module.

4. The system of claim 3, wherein the driving-mode control module further includes instructions to estimate a period of time until the manual driving mode is to commence based, at least in part, on the distance.

5. The system of claim 1, wherein the detected features include lane markings.

6. The system of claim 1, wherein the feature detection simulation module further includes instructions to predict, for at least one of the plurality of hypothetical positions, a position of an obstacle based on a measured speed and heading of the obstacle.

7. The system of claim 1, wherein the driving-mode control module further includes instructions to initiate a transition from the manual driving mode to the autonomous driving mode in response to an absence of identified localization-failure positions.

8. The system of claim 1, wherein the one or more sensors include at least one of a camera and a LIDAR sensor.

9. A non-transitory computer-readable medium for transitioning a vehicle from an autonomous driving mode to a manual driving mode and storing instructions that when executed by one or more processors cause the one or more processors to:
    analyze data from one or more vehicle sensors to detect, at a current position of the vehicle, features ahead of the vehicle in a first detection region and a second detection region, wherein the second detection region extends farther ahead of the vehicle along a direction of travel than the first detection region;
    determine, for each of a plurality of hypothetical positions ahead of the current position along a planned route, which features detected at the current position, if any, lie within the first detection region at that hypothetical position, wherein the plurality of hypothetical positions are at least one of randomly selected, spaced at regular intervals, and selected to coincide with a change in features of a roadway along the planned route, the change in features including one of an intersection, a change in a number of lanes, a beginning of a grade, and an end of a grade;
    identify, among the plurality of hypothetical positions, at least one localization-failure position at which localization of the vehicle will fail due to insufficient features being detected within the first detection region at the at least one localization-failure position; and initiate a transition from the autonomous driving mode to the manual driving mode based, at least in part, on the at least one localization-failure position.

10. The non-transitory computer-readable medium of claim 9, wherein the instructions to initiate a transition from the autonomous driving mode to the manual driving mode further include instructions to notify a driver of the transition.

11. The non-transitory computer-readable medium of claim 9, wherein the instructions to identify, among the plurality of hypothetical positions, at least one localization-failure position further include instructions to calculate a distance from the current position of the vehicle to a localization-failure position.

12. The non-transitory computer-readable medium of claim 11, wherein the instructions to initiate a transition from the autonomous driving mode to the manual driving mode further include instructions to estimate a period of time until the manual driving mode is to commence based, at least in part, on the distance.

13. The non-transitory computer-readable medium of claim 9, wherein the instructions to determine, for each of the plurality of hypothetical positions ahead of the current position along a planned route, which features detected at the current position, if any, lie within the first detection region at that hypothetical position further include instructions to predict, for at least one of the plurality of hypothetical positions, a position of an obstacle based on a measured speed and heading of the obstacle.

14. The non-transitory computer-readable medium of claim 9, wherein the instructions further include instructions to initiate a transition from the manual driving mode to the autonomous driving mode in response to an absence of identified localization-failure positions.

15. A method of transitioning a vehicle from an autonomous driving mode to a manual driving mode, the method comprising:

analyzing data from one or more vehicle sensors to detect, at a current position of the vehicle, features ahead of the vehicle in a first detection region and a second detection region, wherein the second detection region extends farther ahead of the vehicle along a direction of travel than the first detection region;

determining, for each of a plurality of hypothetical positions ahead of the current position along a planned route, which features detected at the current position, if any, lie within the first detection region at that hypothetical position, wherein the plurality of hypothetical positions are at least one of randomly selected, spaced at regular intervals, and selected to coincide with a change in features of a roadway along the planned route, the change in features including one of an intersection, a change in a number of lanes, a beginning of a grade, and an end of a grade;

identifying, among the plurality of hypothetical positions, at least one localization-failure position at which localization of the vehicle will fail due to insufficient features being detected within the first detection region at the at least one localization-failure position; and initiating a transition from the autonomous driving mode to the manual driving mode based, at least in part, on the at least one localization-failure position.

16. The method of claim 15, further comprising notifying a driver of the transition from the autonomous driving mode to the manual driving mode.

17. The method of claim 15, further comprising calculating a distance from the current position of the vehicle to a localization-failure position.

18. The method of claim 17, further comprising estimating a period of time until the manual driving mode is to commence based, at least in part, on the distance.

19. The method of claim 15, further comprising predicting, for at least one of the plurality of hypothetical positions, a position of an obstacle based on a measured speed and heading of the obstacle.

20. The method of claim 15, further comprising initiating a transition from the manual driving mode to the autonomous driving mode in response to an absence of identified localization-failure positions.

* * * * *